US008667458B2

(12) United States Patent
Bassin et al.

(10) Patent No.: US 8,667,458 B2
(45) Date of Patent: Mar. 4, 2014

(54) SYSTEM AND METHOD TO PRODUCE BUSINESS CASE METRICS BASED ON CODE INSPECTION SERVICE RESULTS

(75) Inventors: Kathryn A. Bassin, Endicott, NY (US); Steven Kagan, Oakbrook Terrace, IL (US); Shao C. Li, Beijing (CN); Zhong J. Li, Beijing (CN); He H. Liu, Beijing (CN); Susan E. Skrabanek, Atlanta, GA (US); Hua F. Tan, Beijing (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1055 days.

(21) Appl. No.: 12/558,382

(22) Filed: Sep. 11, 2009

(65) Prior Publication Data

US 2011/0066558 A1     Mar. 17, 2011

(51) Int. Cl.
*G06F 9/44* (2006.01)
(52) U.S. Cl.
USPC ............................................ 717/102; 702/35
(58) Field of Classification Search
None
See application file for complete search history.

(56) References Cited

U.S. PATENT DOCUMENTS

| | | |
|---|---|---|
| 5,539,652 A | 7/1996 | Tegethoff |
| 5,905,856 A | 5/1999 | Ottensooser |
| 6,332,211 B1 | 12/2001 | Pavela |
| 6,442,748 B1 | 8/2002 | Bowman-Amuah |
| 6,456,506 B1 | 9/2002 | Lin |
| 6,477,471 B1 | 11/2002 | Hedstrom et al. |
| 6,519,763 B1 | 2/2003 | Kaufer et al. |
| 6,546,506 B1 | 4/2003 | Lewis |
| 6,601,017 B1 | 7/2003 | Kennedy et al. |
| 6,601,233 B1 | 7/2003 | Underwood |
| 6,725,399 B1 | 4/2004 | Bowman |
| 6,889,167 B2 * | 5/2005 | Curry, III ...................... 702/183 |
| 6,901,535 B2 * | 5/2005 | Yamauchi et al. ......... 714/38.12 |
| 6,988,055 B1 | 1/2006 | Rhea et al. |
| 7,200,775 B1 | 4/2007 | Rhea et al. |
| 7,231,549 B1 | 6/2007 | Rhea et al. |
| 7,334,166 B1 | 2/2008 | Rhea et al. |
| 7,451,009 B2 | 11/2008 | Grubb et al. |
| 7,630,914 B2 | 12/2009 | Veeningen et al. |

(Continued)

OTHER PUBLICATIONS

Office Action dated Nov. 5, 2012 in U.S. Appl. No. 12/558,274, 12 pages.

(Continued)

*Primary Examiner* — Elias Mamo
(74) *Attorney, Agent, or Firm* — Matthew Chung; Roberts Mlotkowski Safran & Cole, P.C.

(57) ABSTRACT

A method is implemented in a computer infrastructure having computer executable code tangibly embodied on a computer readable storage medium having programming instructions. The programming instructions are operable to receive data including code inspection services defect analysis data of a software development project and process the data. Additionally, the programming instructions are operable to determine one or more business metrics based on the data and generate at least one report based on the one or more business metrics.

22 Claims, 17 Drawing Sheets

(56) References Cited

U.S. PATENT DOCUMENTS

| | | | |
|---|---|---|---|
| 7,788,647 | B2 | 8/2010 | Martin et al. |
| 7,809,520 | B2 | 10/2010 | Adachi |
| 7,861,226 | B1 | 12/2010 | Episkopos et al. |
| 7,886,272 | B1 | 2/2011 | Episkopos et al. |
| 7,917,897 | B2 | 3/2011 | Bassin et al. |
| 7,984,304 | B1 | 7/2011 | Waldspurger et al. |
| 8,191,044 | B1 | 5/2012 | Berlik et al. |
| 8,539,438 | B2 | 9/2013 | Bassin et al. |
| 2001/0052108 | A1 | 12/2001 | Bowman-Amuah |
| 2002/0078401 | A1 | 6/2002 | Fry |
| 2002/0188414 | A1 | 12/2002 | Nulman |
| 2003/0018952 | A1 | 1/2003 | Roetzheim |
| 2003/0033191 | A1 | 2/2003 | Davies et al. |
| 2003/0058277 | A1 | 3/2003 | Bowman-Amuah |
| 2003/0070157 | A1 | 4/2003 | Adams et al. |
| 2003/0196190 | A1 | 10/2003 | Ruffolo et al. |
| 2004/0205727 | A1 | 10/2004 | Sit et al. |
| 2004/0267814 | A1 | 12/2004 | Ludwig et al. |
| 2005/0071807 | A1 | 3/2005 | Yanavi |
| 2005/0102654 | A1 | 5/2005 | Henderson et al. |
| 2005/0114828 | A1 | 5/2005 | Dietrich et al. |
| 2005/0144529 | A1 | 6/2005 | Gotz et al. |
| 2005/0209866 | A1 | 9/2005 | Veeningen et al. |
| 2005/0283751 | A1 | 12/2005 | Bassin et al. |
| 2006/0047617 | A1 | 3/2006 | Bacioiu et al. |
| 2006/0248504 | A1 | 11/2006 | Hughes |
| 2006/0251073 | A1 | 11/2006 | Lepel et al. |
| 2006/0265188 | A1* | 11/2006 | French et al. ............... 702/185 |
| 2007/0100712 | A1 | 5/2007 | Kilpatrick et al. |
| 2007/0112879 | A1 | 5/2007 | Sengupta |
| 2007/0174023 | A1 | 7/2007 | Bassin et al. |
| 2007/0234294 | A1 | 10/2007 | Gooding |
| 2007/0283325 | A1 | 12/2007 | Kumar |
| 2007/0283417 | A1 | 12/2007 | Smolen et al. |
| 2007/0300204 | A1 | 12/2007 | Andreev et al. |
| 2008/0010543 | A1 | 1/2008 | Yamamoto et al. |
| 2008/0052707 | A1 | 2/2008 | Wassel et al. |
| 2008/0072328 | A1 | 3/2008 | Walia et al. |
| 2008/0092108 | A1 | 4/2008 | Corral |
| 2008/0092120 | A1 | 4/2008 | Udupa et al. |
| 2008/0104096 | A1 | 5/2008 | Doval et al. |
| 2008/0162995 | A1 | 7/2008 | Browne et al. |
| 2008/0178145 | A1 | 7/2008 | Lindley |
| 2008/0201611 | A1 | 8/2008 | Bassin et al. |
| 2008/0201612 | A1* | 8/2008 | Bassin et al. ............... 714/38 |
| 2008/0255693 | A1 | 10/2008 | Chaar et al. |
| 2009/0070734 | A1* | 3/2009 | Dixon et al. ............... 717/102 |
| 2010/0005444 | A1 | 1/2010 | McPeak |
| 2010/0145929 | A1 | 6/2010 | Burger et al. |
| 2010/0211957 | A1 | 8/2010 | Lotlikar et al. |
| 2010/0275263 | A1 | 10/2010 | Bennett et al. |
| 2010/0332274 | A1 | 12/2010 | Cox et al. |
| 2011/0296371 | A1 | 12/2011 | Marella |
| 2012/0017195 | A1 | 1/2012 | Kaulgud et al. |
| 2012/0053986 | A1 | 3/2012 | Cardno et al. |

OTHER PUBLICATIONS

Office Action dated Nov. 8, 2012 in U.S. Appl. No. 12/558,260, 17 pages.

Office Action dated Dec. 20, 2012 in U.S. Appl. No. 12/558,147, 18 pages.

Office Action dated Nov. 8, 2012 in U.S. Appl. No. 13/595,148, 14 pages.

McGarry, J. et al., "Practical Software Measurement: A Guide to Objective Program Insight", http://pdf.aminer.org/0001361/576/practical_software_measurement.pdf, Naval Undersea Warfare Center, Version 2.1, Part 1 to Part 4, 1996, 299 pages.

Jonsson, G., "A Case Study into the Effects of Software Process Improvement on Product Quality", Jun. 2004, Master's Tesis in Computer Science—University of Iceland, 93 pages.

Office Action dated Oct. 11, 2012 in U.S. Appl. No. 12/558,327, 12 pages.

Notice of Allowance dated Aug. 31, 2012 in U.S. Appl. No. 12/558,375, 16 pages.

Hurlbut, "Managing Domain Architecture Evolution Through Adaptive Use Case and Business Rule Models", 1997, pp. 1-42.

Final Office Action dated Nov. 23, 2012 in U.S. Appl. No. 12/557,886, 42 pages.

Boehm, B., "Software Engineering Economics", IEEE Transactions on Software Engineering, vol. SE-19, No. 1, Jan. 1984, pp. 4-21.

Basili, V. et al., "Comparing the Effectiveness of Software Testing Strategies", IEEE Transactions on Software Engineering, vol. SE-13, No. 12, Dec. 1987, pp. 1278-1296.

Office Action dated Oct. 5, 2012 in U.S. Appl. No. 12/557,816, 13 pages.

Holden, I. et al., "Imporoving Testing Efficiency using Cumulative Test Analysis", Proceedings of the Testing: Academic & Idustrial conference—Practice and Research Techniques, IEEE, 2006, pp. 1-5.

Holden, I., "Improving Testing Efficiency using Cumulative Test Analysis", 2006, 25 slices, retrieved from http://www2006.taicpartorg/presentations/session5/3.pdf, pp. 1-25.

Ponaraseri, S. et al., "Using the Planning Game for Test Case Prioritization", retrieved from http:selab.fbk.eu/tonella/papers/issre2008.pdf, pp. 1-10.

Tonella, P., "Publication List", 2012, retrieved from http://selabibk.eu/tonella/papersbyyear.html, 15 pages.

Office Action dated Jun. 14, 2012 in U.S. Appl. No. 12/557,886, 38 pages.

Ambler, S., "Choosing the Right Software Method for the Job", http://web.archive.org/web/20090219074845/http://agiledata.org/essays/differentStrategies.html, retrieved Jun. 7, 2012, pp. 1-14.

Unknown, "ASTQB—ISTQB Software Testing Certification : ISTQB Syllabi", http://web.archive.orb/web/20090423053623/http://www.astqb.org/educational-resources/syllabi-management5.php, retrieved Jun. 7, 2012, pp. 1-12.

Office Action dated Oct. 3, 2012 in U.S. Appl. No. 12/558,382, 11 pages.

Office Action dated Dec. 7, 2012 in U.S. Appl. No. 12/558,324, 15 pages.

Office Action dated Apr. 13, 2012 in U.S. Appl. No. 12/558,324, 10 pages.

Office Action dated Apr. 27, 2012 in U.S. Appl. No. 12/558,375, 10 pages.

Office Action dated Nov. 23, 2012 in U.S. Appl. No. 12/558,263, 36 pages.

Kwinkelenberg, R. et al., "Smartesting for Dummies", Oct. 14, 2008, Wiley, 36 pages.

Lazic, L. et al., "Cost Effective Software Test Metrics", WSEAS Transactions on Computers, Issue 6, vol. 7, Jun. 2008, pp. 559-619.

Hou, R. et al., "Optimal Release Times for Software Systems with Scheduled Delivery Time Based on the HGDM, IEEE Transactions on Computers, vol. 46, No. 2, Feb. 1997, pp. 216-221.

Notice of Allowance dated Apr. 15, 2013 in related U.S. Appl. No. 12/558,274, 20 pages.

Final Office Action dated Apr. 3, 2013 in related U.S. Appl. No. 12/558,327, 11 pages.

Notice of Allowance dated Apr. 24, 2013 in related U.S. Appl. No. 12/558,260, 9 pages.

Final Office Action dated Mar. 29, 2013 in related U.S. Appl. No. 12/558,263, 54 pages.

Ulrich, "Test Case Dependency Processing in Robot Framework", https://groups.google.com/forum/?fromgroups#!topic/robotframework-users/twcycBNLXI4, Google, Feb. 16, 2009, pp. 1-4.

Final Office Action dated Mar. 28, 2013 in related U.S. Appl. No. 12/557,816, 14 pages.

Notice of Allowance dated Apr. 2, 2013 in related U.S. Appl. No. 12/558,147, 10 pages.

Final Office Action dated Jun. 13, 2013 in related U.S. Appl. No. 13/595,148, 8 pages.

Chan et al., "A Tool to Support Perspective Based Approach to Software Code Inspection", Proceedings of the 2005 Australian Software Engineering Conference, IEEE, 2005, 8 pages.

Notice of Allowance in related U.S. Appl. No. 12/557,816 dated Jun. 14, 2013, 6 pages.

(56) References Cited

OTHER PUBLICATIONS

Notice of Allowance in related U.S. Appl. No. 12/558,327 dated Jun. 24, 2013, 6 pages.
Final Office Action in related U.S. Appl. No. 12/558,324 dated Jul. 18, 2013, 15 pages.
Notice of Allowance in related U.S. Appl. No. 13/595,148 dated Sep. 9, 2013, 14 pages.
Notice of Allowance dated Nov. 1, 2013 in related U.S. Appl. No. 12/557,886, 15 pages.
Notice of Allowance dated Sep. 24, 2013 in related U.S. Appl. No. 13/902,034, 8 pages.

* cited by examiner

| Activities / Triggers | Des. Rev EFF(5%) | Unit Test EFF(6%) | Func Test EFF(50%) | SIT EFF(23%) | UAT EFF(16%) |
|---|---|---|---|---|---|
| Design Conform | ■90% | □ | ■20% | □ | □ |
| Logic/Flow | ■10% | □ | □ | □ | □ |
| Lateral Compat | □ | □ | □ | □ | □ |
| Language | □ | □ | □ | □ | □ |
| Side Effects | □ | □ | □ | □ | □ |
| Concurrency | □ | □ | □ | □ | □ |
| Simple Path | □ | ■90% | □ | □ | □ |
| Complex path | □ | ■10% | □ | □ | □ |
| Coverage | □ | □ | ■50% | □50% | □50% |
| Variation | □ | □ | ■30% | □20% | □20% |
| Sequence | □ | □ | □ | □20% | □20% |
| Interaction | □ | □ | □ | □10% | □10% |
| Recovery | □ | □ | □ | □ | □ |
| Software Config | □ | □ | □ | □ | □ |
| Hardware Config | □ | □ | □ | □ | □ |
| Startup/Restart | □ | □ | □ | □ | □ |
| Blocked Test | □ | □ | □ | □ | □ |
| Total | 100% | 100% | 100% | 100% | 100% |

FIG. 5

| Phase/Activity | Industry Average Cost | Industry Average Cost w/ 20% adjustment | Industry Average Cost w/30% adjustment | Industry Relative Cost | Variance in Literature |
|---|---|---|---|---|---|
| High Level Requirements | $120 | $96 | $84 | 1 | 1 – 1.5 |
| High Level Design | $480 | $384 | $336 | 4 | 3 - 10 |
| Detailed Requirements | $240 | $192 | $168 | 2 | ----- |
| Detailed Design | $840 | $672 | $588 | 7 | ----- |
| Coding / Unit Test | $1200 | $960 | $840 | 10 | 10 - 22 |
| Early Functional Test (ST) | $1920 | $1536 | $1344 | 16 | 16 - 40 |
| SIT | $4560 | $3648 | $3192 | 38 | 35 - 50 |
| UAT | $8400 | $6720 | $5880 | 70 | 60 - 75 |
| Production | $16800 | $13440 | $11760 | 140 | 90 - 170 |

FIG. 6

| Defect Removal Activity | Benchmark (Industry, Phase, Maturity) | Before Code Inspection Services | After Code Inspection Services | Defect Count and $$$ Savings |
|---|---|---|---|---|
| High Level Requirements/ Design Review | (%) | 600 | 600 | n/a |
| Detailed Requirements/ Design Review | (%) | 263 | 263 | n/a |
| Code Inspection | (%) | 227 | 227 | n/a |
| Unit Test | (%) | 83 | 83 | n/a |
| Code Inspection Services |  |  | 59 | 59/-$70,800 |
| System Test | (%) | 194 | 194 | 0 / $0 |
| SIT | (%) | 55 | 46 | 9 / $41,040 |
| UAT | (%) | 96 | 96 | 0 / $0 |
| Production | (%) | 101 | 51 | 50 / $840,000 |
| TOTAL |  | 1619 | 1619 | $810,240 |

FIG. 14

Pre-Code Inspection Services Defect Discoveries by Phase

| Reviews | UT | ST | SIT | Performance Test | UAT | Production | Total |
|---|---|---|---|---|---|---|---|
| 1090 | 83 | 194 | 55 | 30 | 96 | 101 | 1649 |

(Actual or Projected) Post-Code Inspection Services Defect Discoveries by Phase

| Reviews | UT | ST | SIT | Performance Test | UAT | Production | Total |
|---|---|---|---|---|---|---|---|
| 600 | 40 | 180 | 50 | 10 | 80 | 55 | 1015 |
| $196,000 | $51,600 | $26,880 | $22,800 | $38,400 | $134,400 | $772,800 | $1,242,880 |

FIG. 15

Reducing Cycle Time

Pre-Code Inspection Services Person Days by Phase

1200

| Reviews | UT | ST | SIT | Performance Test | UAT | Total |
|---|---|---|---|---|---|---|
| 30 | 20 | 30 | 20 | 20 | 20 | 140 |

(Actual or Projected) Post-Code Inspection Services Person Days by Phase

| Reviews | UT | ST | SIT | Performance Test | UAT | Total |
|---|---|---|---|---|---|---|
| 17 | 10 | 28 | 18 | 17 | 7 | 97 |
| $65,000 | $80,000 | $8,000 | $8,000 | $9,000 | $26,000 | $196,000 |

SYSTEM AND METHOD TO PRODUCE BUSINESS CASE METRICS BASED ON CODE INSPECTION SERVICE RESULTS

CROSS REFERENCE TO RELATED APPLICATION

The present invention is related to copending U.S. application Ser. Nos. 12/558,327, filed on Sep. 11, 2009 and 12/558,274, filed on Sep. 11, 2009, the contents of which are incorporated herein in their entireties by reference.

FIELD OF THE INVENTION

The present invention generally relates to defect analysis, and more particularly, to a method and system to produce business case metrics based on code inspection service results.

BACKGROUND

While software systems continue to grow in size and complexity, business demands continue to require shorter development cycles. This has led software developers to compromise on functionality, time to market, and quality of software products. Furthermore, the increased schedule pressures and limited availability of resources and skilled labor can lead to problems such as incomplete design of software products, inefficient testing, poor quality, high development and maintenance costs, and the like. This may lead to poor customer satisfaction and a loss of market share for software developers.

To improve product quality, many organizations devote an increasing share of their resources to testing and identifying problem areas related to software and the process of software development. Accordingly, it is not unusual to include a quality assurance team in software development projects to identify defects in the software product during, and after development of a software product. By identifying and resolving defects before marketing the product to customers, software developers can assure customers of the reliability of their products, and reduce the occurrence of post-sale software fixes such as patches and upgrades which may frustrate their customers.

Software testing may involve verifying the correctness, completeness, security, quality, etc. of a product. During testing, a technical investigation may be performed by, for example, executing a program or application with the intent to find errors. If errors are found, one or more areas in the software code may be identified based on the errors. Therefore, developers may alter the code in the identified regions to obviate the error.

After a defect has been fixed, data regarding the defect, and the resolution of the defect, may be stored in a database. The defects may be classified and analyzed as a whole using, for example, Orthogonal Defect Classification (ODC). ODC is a commonly used complex quality assessment schema for understanding code related defects uncovered during testing.

It is widely accepted in the testing industry that the least expensive defects to fix are those found earliest in the life cycle. However, a problem in complex system integration testing is that there may be very few comprehensive opportunities for projects to remove defects cost effectively prior to late phase testing—and by that point in the life cycle (i.e., late phase testing), defects are relatively expensive to fix. Furthermore, for many projects, there are particular kinds of high impact exposures—defects in the area of security, for example—that are critical to find and fix, but are also difficult to test for.

There are numerous automated code inspection tools available on the market today designed to address this problem; however, for many projects, it is not cost effective for an organization to purchase licenses for all of the tools needed to cover all of the exposures of interest to them. Moreover, even if it was cost effective for an organization to purchase licenses for all of the tools needed to cover all of the exposures, there is no way to understand the return on this investment in terms of the impact on reducing the numbers of defects found in late phase testing and in production.

That is, no defect analysis schema capable of accurately measuring value received from performing specific automated code inspection activities is known to exist. For example, software defect analysis models are incapable of providing return on investment metrics, e.g., because they do not provide actionable recommendations. Thus, there is no way to understand the return on this investment (e.g., the purchase of code inspection services) in terms of the impact on reducing the numbers of defects found in late phase testing and in production. That is, the code inspection services reports (for example, from the plurality of code inspection services, e.g., specifically tailored for their project) do not interpret defects uncovered via the automated code inspection subscription service and do not provide actionable recommendations. Rather, such code inspect service reports, for example, only identify defects uncovered via the automated code inspection subscription service. As a result, an organization cannot measure the cost versus the benefit of taking an improvement action because the code inspection services report does not point to an improvement action in the first place. The code inspection services report, for example, cannot tell test managers whether or not their test effort is effective (whether they are finding the kinds of defects their test effort is designed to find) because the analysis models do not collect the information necessary to provide such insights. Thus, this automated code inspection subscription service does not allow projects to accurately assess the impact of automated code inspections on, for example, critical exposure areas and does not allow for effective planning of, for example, late phase testing and production support needs.

As a result, an organization, for example, cannot determine that a particular distribution of defects (e.g., as determined by the automated code inspection subscription service) indicates that the organization may need to devote more focus on shifting defect removal to earlier phases in the software development life cycle. Additionally, for example, an organization cannot determine an expected resulting defect distribution should the shifting of the defect removal to earlier phases be achieved. Because current defect analysis models fall short of demonstrating their value relative to their costs, organizations that could benefit the most from in depth code inspection analysis may not frequently leverage in depth code inspection analysis (e.g., for one or more projects).

Accordingly, there exists a need in the art to overcome the deficiencies and limitations described hereinabove.

SUMMARY

In a first aspect of the invention, a method is implemented in a computer infrastructure having computer executable code tangibly embodied on a computer readable storage medium having programming instructions. A method is implemented in a computer infrastructure having computer executable code tangibly embodied on a computer readable storage medium having programming instructions. The programming instructions are operable to receive data including code inspection services defect analysis data of a software development project and process the data. Additionally, the programming instructions are operable to determine one or more business metrics based on the data and generate at least one report based on the one or more business metrics.

In another aspect of the invention, a system comprises a data receiving tool operable to receive data including at least one of code inspection services defect analysis data of a software development project, organization data and other data. Additionally, the system comprises a data processing tool operable to process the data and determine one or more business metrics based on the data. The one or more business metrics comprises at least one of: a benefit for shifting defect removal earlier, a benefit for preventing an injection of defects, a benefit for reducing a cycle time, a benefit of reducing invalid defects and a benefit for reducing production defects. Additionally, the system comprises a report generation tool operable to generate at least one report based on the one or more business metrics.

In an additional aspect of the invention, a computer program product comprising a computer usable storage medium having readable program code embodied in the medium is provided. The computer program product includes at least one component operable to receive data including code inspection services defect analysis data of a software development project and process the data. Additionally, the at least one component is operable to determine one or more business metrics based on the data including at least one of a benefit for shifting defect removal earlier, a benefit for preventing an injection of defects, a benefit for reducing a cycle time and a benefit for reducing production defects. Furthermore, the at least one component is operable to generate at least one report based on the one or more business metrics.

In a further aspect of the invention, a computer system for defect analysis comprises a CPU, a computer readable memory and a computer readable storage media. Additionally, the system comprises first program instructions to receive data including code inspection services defect analysis data of a software development project and second program instructions to process the data to determine one or more business metrics based on the data. The business metrics include at least one of a benefit for shifting defect removal earlier, a benefit for preventing an injection of defects, a benefit for reducing a cycle time and a benefit for reducing production defects. Additionally, the system comprises third program instructions to generate at least one report based on the one or more business metrics. The first, second and third program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 5 illustrates an exemplary test process in accordance with aspects of the invention;

FIG. 6 illustrates an exemplary cost table in accordance with aspects of the invention;

FIGS. 13-17 illustrate exemplary business case metrics in accordance with aspects of the present invention.

DETAILED DESCRIPTION

Figure 1:
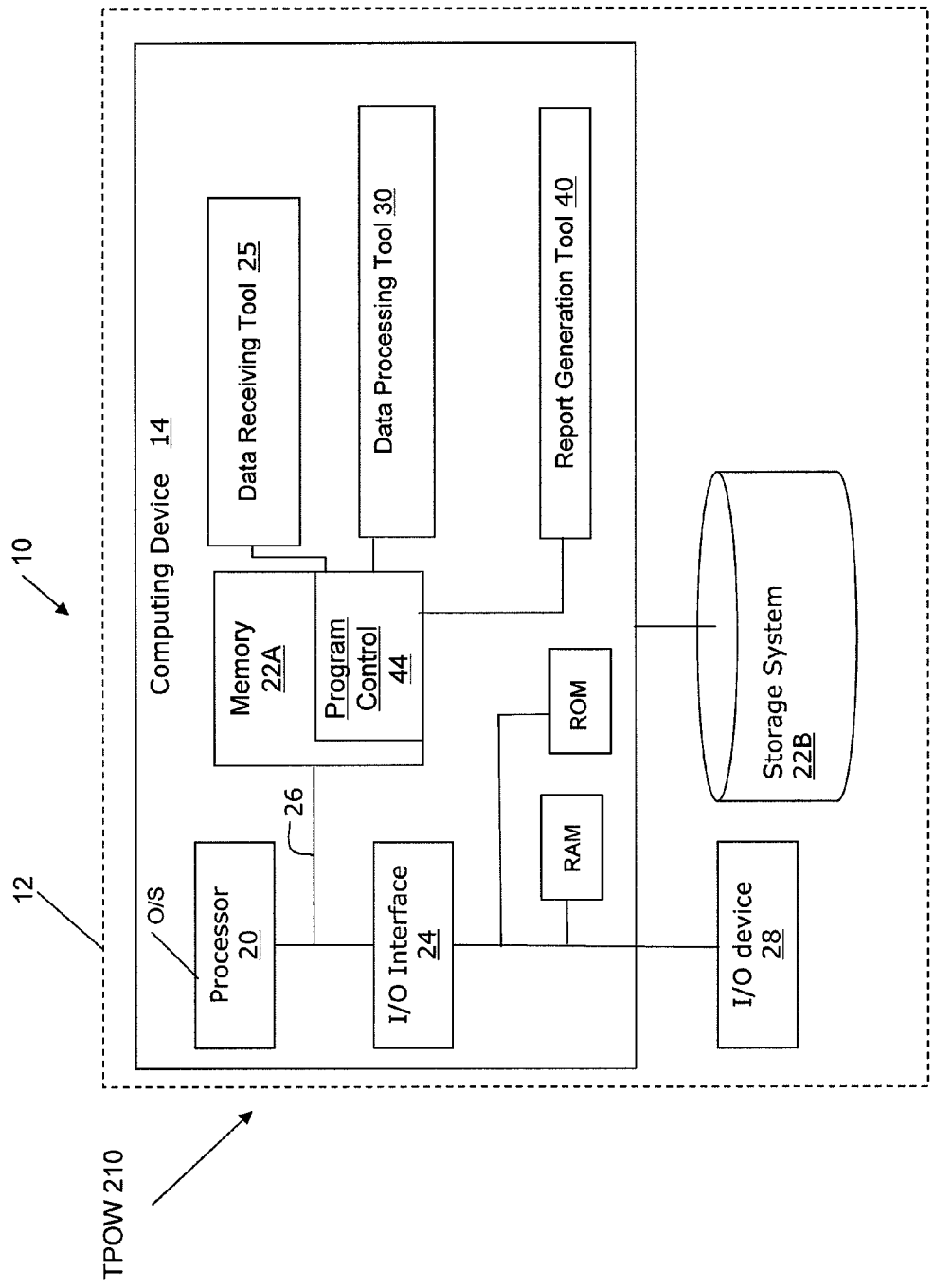
FIG. 1 shows an illustrative environment for implementing the steps in accordance with aspects of the invention.

The present invention generally relates to defect analysis, and more particularly, to a method and system to produce business case metrics based on code inspection service results. In embodiments, the present invention is operable to identify, for example, improvement actions (e.g., the highest impact improvement actions) projects can take to reduce and/or prevent test and production defects. Additionally, the present invention is operable to project the costs relative to the benefits for each improvement action that may be taken. In embodiments, the present invention applies defect analysis metrics to code inspection error output (e.g., automated code inspection error output) to produce, for example, detailed areas for improvement and/or the cost versus the benefit received, e.g., by an organization, if one or more of such areas are improved.

In embodiments, the present invention is operable to identify specific immediate benefits in the area of shifting defect removal earlier. Additionally, the present invention provides future release improvement information (for example, areas of preventing defect injection in the first place and/or reducing cycle time, which reduces the duration and/or investment needed in later phase, more expensive test efforts) by, for example, identifying weak areas in a software development project.

Implementing the present invention provides an organization business case metrics. By providing improvement recommendations and the supporting metric evidence of the impact of making the improvement with respect to cost and benefit received, the present invention enables an organization to make more informed decisions, for example, with regard to improvement investments. In embodiments, for example, the present invention provides an organization business case metrics (e.g., return on investment business case metrics) to enable determinations as to whether, e.g., an investment is placed in the right improvement actions relative to the organization's goals for their one or more projects (e.g., software development projects).

Moreover, implementing the present invention provides projects business case metrics that enable (e.g., justify) one or more beneficial improvement investments, for example, by projecting such improvement investments' benefits outweigh their costs (as opposed to other possible improvement investments whose benefits, for example, may not outweigh its costs). By providing an ability to accurately weigh improvement investment strategy options with respect to costs and benefits through a relatively low cost automated process, the present invention enables an organization to realize significant quality enhancements progress, e.g., from release to release.

By implementing the present invention, an organization may allow projects to accurately assess the impact of automated code inspections on critical exposure areas, which can in turn be used to more effectively plan late phase testing and production support needs. For example, the defect analysis report will provide insights that will enable projects to optimize, for example, their go-forward test planning.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form, of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

- an electrical connection having one or more wires,
- a portable computer diskette,
- a hard disk,
- a random access memory (RAM),
- a read-only memory (ROM),
- an erasable programmable read-only memory (EPROM or Flash memory),
- an optical fiber,
- a portable compact disc read-only memory (CDROM),
- an optical storage device,
- a transmission media such as those supporting the Internet or an intranet, or
- a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1). In embodiments, the environment 10 may be designated as a report generation system 210.

The computing device 14 includes a data receiving tool 25, a data processing tool 30 and a report generation tool 40, which are operable to receive data (e.g., the code inspection service output, organization data and/or other inputs), process the received data, and generate one or more business case metrics, e.g., the processes described herein. For example, in embodiments, the data receiving tool 25 is operable to receive from the code inspection service: defects discovered by each trigger, percentage defects will be reduced after prevention actions taken by each trigger, time spent by the code inspection services and/or non-functional requirements/functional requirements (NFR/FR) defect volume escapes to production if code inspection services not used, amongst other inputs, as discussed further below. Additionally, the data receiving tool 25 is operable to receive from an organization (e.g., a client): a test effort, a test efficiency, defect escape probability tables, a current project profile and/or a test process, amongst other data. Furthermore, the data receiving tool 25 is operable to receive other inputs, including, for example: average cost to fix defect in different phases of a software development life cycle and/or a daily rate for a human resource, amongst additional inputs. Utilizing one or more of the inputs received by the data receiving tool 25, the data processing tool 30 is operable to determine one or more outputs. For example, in accordance with aspects of the invention, the outputs may include one or more of a benefit for shifting defect removal earlier, a benefit for preventing the injection of defects, a benefit for reducing cycle time and a benefit for reducing production defects, amongst other outputs, as discussed further below. The report generation tool 40 is operable to generate one or more business case metrics illustrating the one or more benefits. The data receiving tool 25, the data processing tool 30 and the report generation tool 40 can be implemented as one or more program code in the program control 44 stored in memory 22A as separate or combined modules.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls the data receiving tool 25, the data processing tool 30 and the report generation tool 40. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

There are numerous automated code inspection tools designed to provide opportunities for projects to remove defects cost effectively prior to late phase testing—and by that point in the life cycle (i.e., late phase testing), defects are relatively expensive to fix; however, for many projects, it is not cost effective for an organization to purchase licenses for all of the tools needed to cover all of the exposures of interest to them. Moreover, even if it was cost effective for an organization to purchase licenses for all of the tools needed to cover all of the exposures, there is no way to understand the return on this investment in terms of the impact on reducing the numbers of defects found in late phase testing and in production.

As a result of these impracticalities, few complex system integration projects avail themselves of automated code inspection defect removal strategies, even though applying them to unit tested code prior to beginning system testing is one of the most cost effective options available. This problem has been addressed in part by, e.g., a service provider assembling a set of code inspection tools designed to address four areas, as shown in TABLE 1 below.

TABLE 1

| Types of analysis: | Functional Outputs | Technologies supported | Static Code analysis | Dynamic Code analysis |
|---|---|---|---|---|
| 1 | Industry and Best Practice Standards Compliance | Maintainability, Robustness, Quality, Changeability, Performance, Programming Practices, Architectural Design, Documentation | COBOL, C++, J2EE/Java, ABAP, Microsoft.NET | X |
| 2 | Security | Application Privacy, Authentication, Authorization, Client-side Attacks, Command Execution, Information Disclosure, Location, Logical Attacks | Web Applications | X |
| 3 | Memory Management | Memory leaks, Memory access errors, Memory state tracking, Quantify for application performance profiling, Coverage | Web Applications | X |
| 4 | Usability and Accessibility | Accessibility | Web Applications | X |

With this approach, for example, a project (e.g., a software project of an organization) can purchase code inspection services from the service provider on an as-needed basis without requiring any tool purchase or licensing costs for tools they may only need to leverage on a limited basis. Thus, a project may, for example, utilize a plurality of code inspection services (e.g., specifically tailored for their project) and receive code inspection services reports from the service provider. Thus, by assembling a set of code inspection tools and providing for purchase of code inspection services on an as-needed basis, utilization of these code inspection services is rendered more cost effective.

Implementing the present invention, leveraging multiple code inspection tools in a defect removal/analysis test service at the unit test phase of the life cycle, enables projects to realize significant cost savings because, for example, finding and fixing high value defects at this relatively early phase (i.e., unit test) is far less expensive than attempting to find and fix defects in any of the late phase tests (e.g., after unit test), or especially in production. The present invention also enables projects to measure the impact of finding and/or fixing these defects on later test phases. For example, if the project has already adequately addressed security concerns in the automated code inspection, the organization can reduce or eliminate test cases from the execution plan and move to production earlier without sacrificing quality or increasing risk.

When an automated code inspection service is performed, error output is created by each tool leveraged. This information is in turn mapped to defect classification that is used to produce a defect analysis of the defects uncovered during the activity. This information may be provided in a detailed analysis report as disclosed in related U.S. application Ser. No. 12/558,274, filed on Sep. 11, 2009.

In embodiments, projects can select any combination of tools to be applied to their code (e.g., WebKing, CAST, Purify Plus™, AppScan®, and ABAP Code Optimizer). (Purify Plus and AppScan are trademarks of International Business Machines Corporation in the United States, other countries, or both. WebKing is a trademark of Parasoft Corporation in the United States, other countries, or both.) Once that analysis has been produced, key analysis information is input into the TPOW (Test Planning Optimization Workbench) tool. TPOW then produces the business case as discussed further below.

High Level Flows

Figure 2:
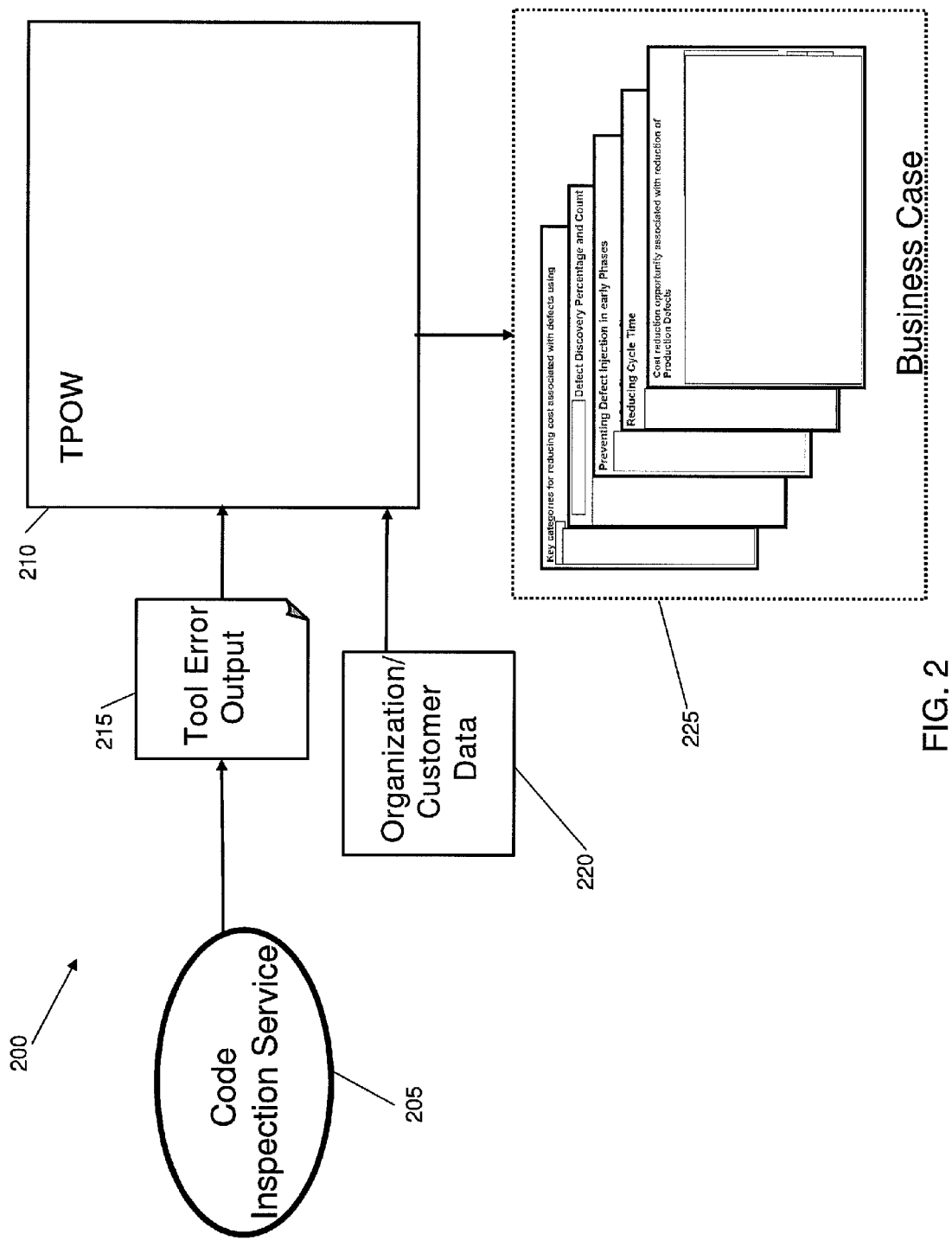
FIGS. 2-3 show exemplary high levels flows in accordance with aspects of the invention.

FIG. 2 illustrates a high level flow diagram 200 in accordance with aspects of the invention. As shown in FIG. 2, a code inspection service 205 (e.g., an automated code inspection service) is performed on code, e.g., provided by a client, which creates output information (e.g., tool error output 215). The TPOW 210 receives the output of selected code inspection services, e.g., using the data receiving tool 25, and determines defect classifications, as set forth in related U.S. application Ser. No. 12/558,274, filed on Sep. 11, 2009. Additionally, the TPOW 210 may receive organization/customer data 220 from the client, e.g., the organization whose code has been analyzed by the code inspection services. The TPOW 210 receives the tool error output 215 and the organization/customer data 220 and determines one or more business case metrics 225, as explained further below.

Figure 3:
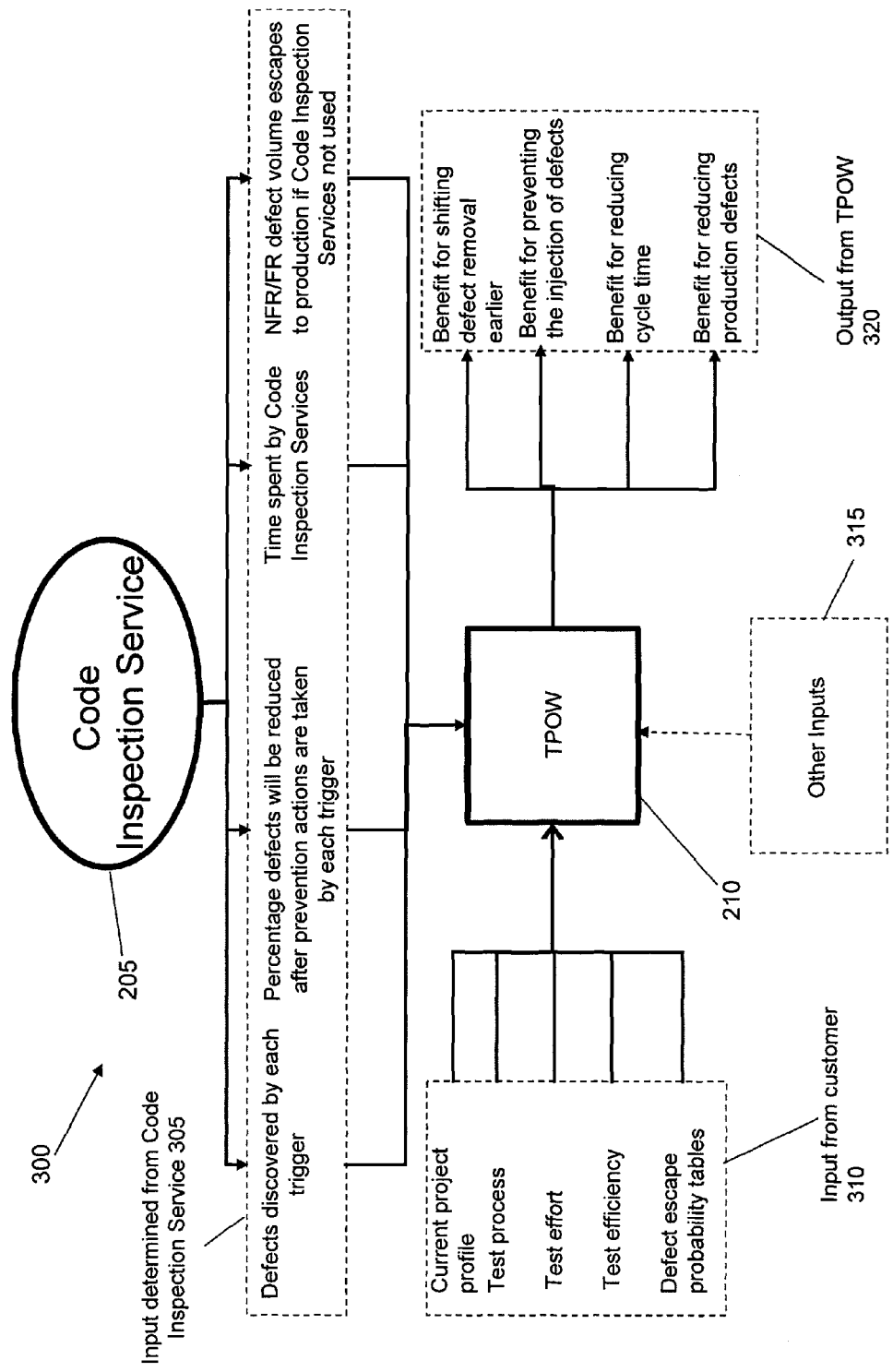

FIG. 3 illustrates another high level flow diagram 300 in accordance with aspects of the invention. As shown in FIG. 3, in embodiments, the TPOW 210 receives inputs from the code inspection service 305 (e.g., inputs derived from the code inspection service). Inputs from the code inspection service 305 may include, for example, defects discovered by each trigger, percentage defects will be reduced after prevention actions taken by each trigger, time spent by the code inspection services, and non-functional requirements/functional requirements (NFR/FR) defect volume escapes to production if code inspection services not used, amongst other inputs.

Triggers (or trigger signatures) may be specific conditions present when (or circumstances under which) a defect is uncovered during testing of software code. In embodiments, one way in which to classify defects is shown in related U.S. application Ser. No. 12/558,274, filed on Sep. 11, 2009, which discloses a method and system for receiving an output from code inspection services (e.g., an identification of code errors discovered using the code inspection services) and determining a classified data output including defects determined by code inspection services classified by each trigger. The present invention utilizes the classified data output, as discussed further below, to identify the defects discovered by each trigger.

Additionally, the present invention utilizes the classified data output to determine the percentage defects will be reduced after prevention activities are taken by each trigger. That is, the classified data output indicates total number of defects found (using the code inspection services) and a number of defects found for each trigger, thus indicating the number of defects for each trigger as a percentage of overall defects. Using this information, the present invention is operable to determine a percentage of defects that will be reduced after prevention actions taken by each trigger, e.g., an impact of prevention actions. For example, if a "variation" trigger signature is observed for thirty percent of the defects, upon prevention actions for the "variation" trigger, approximately thirty percent of the defects will be reduced after prevention actions taken for the "variation" trigger. Moreover, using the classification of defects by trigger, for example, as taught in related U.S. application Ser. No. 12/558,274, filed on Sep. 11, 2009, a percentage defects will be reduced after prevention actions taken by each trigger may be determined.

Additional input from the code inspection service includes a time spent by the code inspection services (e.g., in hours, days, etc.) and NFR/FR defect volume escapes to production if code inspection services not used. In general, functional requirements may define what a system is supposed to do (e.g., specific behavior or functions) whereas non-functional requirements may define how a system is supposed to be. That is, a non-functional requirement may be a requirement that specifies criteria that can be used to judge the operation of a system, rather than specific behaviors. Non-functional requirements can be divided into two main categories: execution qualities, for example, such as security and usability, which are observable at run time; and evolution qualities, such as testability, maintainability, extensibility and scalability, which may be embodied in the static structure of the software system.

In accordance with aspects of the invention, the TPOW 210 also receives (or determines) both NFR and FR defect volume escapes to production if code inspection services not used, which provides a broader analysis base (e.g., both functional and non-functional requirements). That is, the code inspection service identifies defects, e.g., in a clients software code. Thus, the NFR/FR defect volume escapes to production if code inspection services are not used include each of these identified defects, which may include functional and non-functional defects. While the code inspection service may also be operable to fix (e.g., remove) those identified defects, normally the defects identified by the code inspection service may be removed later.

Additionally, as illustrated in FIG. 3, the TPOW 210 is operable to receive one or more inputs from an organization 310, e.g., a customer. In embodiments, such inputs 310 may include a test effort, a test efficiency, defect escape probability tables, a current project profile and a test process, amongst other data. The test effort is an indication of how much effort (e.g., quantified in person-days) will be devoted to testing. As the customer (e.g., an organization) may determine how much effort will be devoted to testing, the customer is able to supply this information. The test efficiency indicates approximately how many defects will be discovered by each person-day. If the testing involves multiple teams (e.g., at different locations around the world), the test efficiency may indicate a daily rate for each of the teams. In embodiments, the test efficiency (or daily rate) may be determined, for example, through review of historical test efficiencies for the organization, e.g., for other software projects. Defect escape probability tables, which are known to those of ordinary skill in the art, may indicate, for example, that if one defect can be discovered by trigger "x," what is the probability that the same defect can be discovered by trigger "y."

A product profile may include a size of the software code (e.g., how many lines of code, function points, and/or person-months) and a product difficulty index ("0"-"5") for each of intraface, interface, timing, design and documentation. A product profile is discussed further with reference to FIG. 4. A test process indicates an effort distribution by activities and triggers. These inputs from a customer 310 are discussed in more detail below with reference to FIG. 5. Furthermore, in embodiments, the TPOW 210 is operable to optionally receive other inputs (e.g., average cost to fix defect in different phases of a software development life cycle, daily rate for a human resource, etc.), which are understood by those of ordinary skill in the art, and some of which are discussed below with reference to FIG. 6.

Referring again to FIG. 3, utilizing one or more of the inputs derived from the code inspection services 205, one or more inputs from the customer 310 and/or optionally, one or more other inputs 315, the TPOW 210 is operable to determine one or more outputs from the TPOW 320. For example, in accordance with aspects of the invention, the output from the TPOW 320 may include one or more of a benefit for shifting defect removal earlier, a benefit for preventing the injection of defects, a benefit for reducing cycle time and a benefit for reducing production defects, amongst other outputs. The operation of the TPOW 210 in determining one or more outputs from the TPOW 320 is discussed in further detail with reference to FIGS. 8-12.

Figure 4:
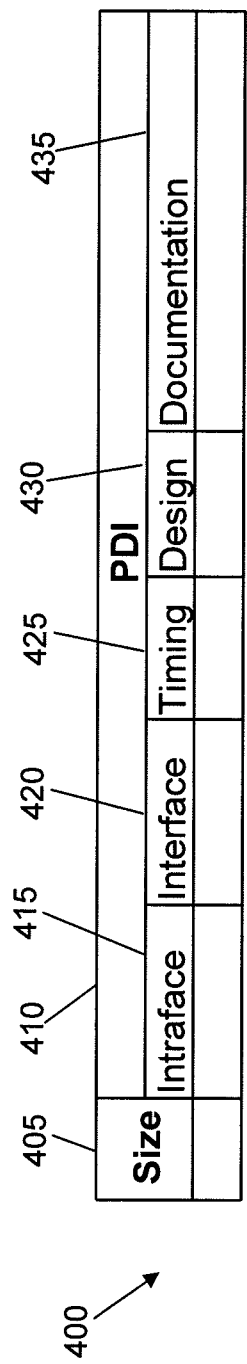
FIG. 4 illustrates an exemplary product profile in accordance with aspects of the invention.

FIG. 4 illustrates an exemplary current product profile 400 in accordance with aspects of the invention. The current product profile 400 indicates a relative size of an organization's software code project as well as a product difficulty index (PDI), which indicates a relative complexity of the project for each of different project areas, including, for example, intraface, interface, timing, design and documentation. As shown in FIG. 4, the current product profile 400 includes a size column 405 which indicates a size of the software code (e.g., how many lines of code, function points, and/or person-months). Additionally, the current product profile 400 includes a PDI column 410, which includes sub-columns for intraface 415, interface 420, timing 425, design 430 and documentation 435. In embodiments, a product difficulty index ("0"-"5") for each of the sub-columns for intraface 415, interface 420, timing 425, design 430 and documentation 435 may be determined by the customer, a service provider, and/or a third party. In embodiments, past experience with other projects, for example, may be used to rate the relative complexity of a current project. This determination of PDI may focus on the design content itself, and may not be influenced by, for example, the skill of the team, KLOC values (which is an acronym for thousand (K) (L)ines (O)f (C)ode and indicates a number of code defects per thousand lines of code), time pressures, etc. A PDI area value of "0" indicates that the respective area (e.g., intraface, interface, timing, design and documentation) has no impact on the complexity of the project. Conversely, a PDI area value of "5" indicates that the respective area has a high impact on the complexity of the project.

The PDI value for the intraface area indicates a degree to which intrafaces between modules and/or subroutines within the product (e.g., the software code project) are complex and influence design decisions. The PDI value for the interface area indicates a degree to which interface between the product (hardware or software) and other products across the system are complex. If there are a lot of interfaces, for example, but these interfaces are straightforward, the project should not necessarily be considered complex in the context of this factor. The PDI value for the timing (timing/serialization) area indicates an extent to which timing and serialization considerations are considered complex and influence design decisions. For example, such considerations may include lock hierarchy, loss of control, referencing or changing data available for global use, amongst other considerations.

The PDI value for the design (overall design) area indicates an extent to which the overall design is complex. For example, a new function may be moderately complex. However, if, for example, the new function is integrated with other code which is complex, poorly designed, and/or error prone, then a higher PDI value for the design area may be warranted. The PDI value for the documentation (internal documentation) area indicates a degree to which already existing function and interfaces are poorly documented. This may be relevant in environments including inadequately documented heritage and/or ported or vended code. The current product profile (e.g., the size and PDI values) for a project may be used as an input from customer, as described further below.

FIG. 5 illustrates an exemplary test process 500, which indicates an effort distribution by activities and by triggers. As shown in FIG. 5, the activities 525 are listed in the activities row 505 and include activities of the software development life cycle, for example, design review, unit test, function test, system integration test (SIT) and/or user accept test (UAT), amongst other activities. The triggers 530 are listed in the triggers column 510 and include triggers (e.g., design conformance, logic/flow, language, etc.) for detected or expected defects. As shown in FIG. 5, the test process 500 indicates for each activity 525 (e.g., design review, unit test, function test, SIT and/or UAT) an expected (or detected) number of defects having each trigger 530. Thus, with exemplary test process 500, at the design review activity, ninety percent of the defects found during this activity are expected to have a design conformance trigger signature and ten percent of the defects found during this activity are expected to have a logic flow trigger signature. As shown in FIG. 5, as indicated in the total row 520, for each activity the total percentage of trigger signatures sums to one-hundred percent.

Additionally, exemplary test process 500 includes an effort row 515, which indicates an expected (or actual) investment of resources for each activity as a percentage of total investment over the entire software development life cycle. Therefore, the sum of the effort at each activity should sum to one hundred percent (e.g., 5%+6%+50%+23%+16%=100%). Returning to the above example, as shown in FIG. 5, the effort row 515 indicates that five percent of the total investment of resources should be devoted to the design review activity. In contrast, fifty percent of the total investment of resources should be devoted to the function test activity (also called a system test).

In embodiments, the test process 500 may be determined based on an organization's maturity profile, as described in related U.S. application Ser. No. 12/558,327, filed on Sep. 11, 2009, although other methods may also be contemplated by the present invention. Additionally, in embodiments, the test process 500 may be determined, for example, based on an organization's past project data, when available. That is, an organization may review past project data (e.g., a similar project) to determine expected trigger signatures for one or more software development life cycle areas. Additionally, an organization may review past project data (e.g., a similar project) to determine relative investment efforts (e.g., percentages of total investment efforts) for one or more software development life cycle areas.

FIG. 6 illustrates an exemplary cost table 600 indicating exemplary average costs to fix a defect in different phases of a software development life cycle. Cost table 600 includes a phase/activity column 605 listing the phase/activities 635 in the software development lifecycle (e.g., high level requirements, high level design, unit test, etc.). Additionally, the cost table 600 includes industry average cost for fixing the same defect at the different stages/activities 635. As can be observed from exemplary table 600, the approximate cost to fix a defect at the high level requirements phase is $120. However, with this example, if that same defect is not fixed until the production phase, fixing that same defect will cost $16,800.

Industry average cost with 20% adjustment column 615 and industry average cost with 30% adjustment column 620 indicate the cost for a software fix with 20% and 30% adjustments, respectively, which, in embodiments, may more accurately reflect an organization's cost for fixing the defect. The industry relative cost column 625 indicates the cost of fixing a defect relative to fixing the defect at the high level requirements phase/activity. Thus, for example, high level requirements have an industry relative cost of "1" and high level design has an industry relative cost of "4" ($480/$120=4). Additionally, exemplary cost table 600 indicates a variance that may be observed for the industry relative cost. For example, while in the exemplary table 600, the industry relative cost for fixing a defect at production is 140, this value may vary between approximately 90 and 170. The derivation of exemplary cost table 600 is well understood in the art, and as such, those of ordinary skill in the art may practice the invention without further explanation of the derivation of exemplary cost table 600. The exemplary cost table 600 may be used as an "other" input 315 to the TPOW 210, as explained below. As should be understood, cost table 600 is an example of costs for defect escapes. As such, exemplary cost table 600 should not be construed as limiting the present invention.

Flow Diagrams

FIGS. 7-12 show exemplary flows for performing aspects of the present invention. The steps of FIGS. 7-12 may be implemented in the environment of FIG. 1, for example. The flow diagrams may equally represent high-level block diagrams or swim-lane diagrams of the invention. The flowchart and/or block diagrams in FIGS. 7-12 illustrate the architecture, functionality, and operation of possible implementations of systems, methods and computer program products according to various embodiments of the present invention. In this regard, each block in the flowcharts, block diagrams or swim-lane diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 7:
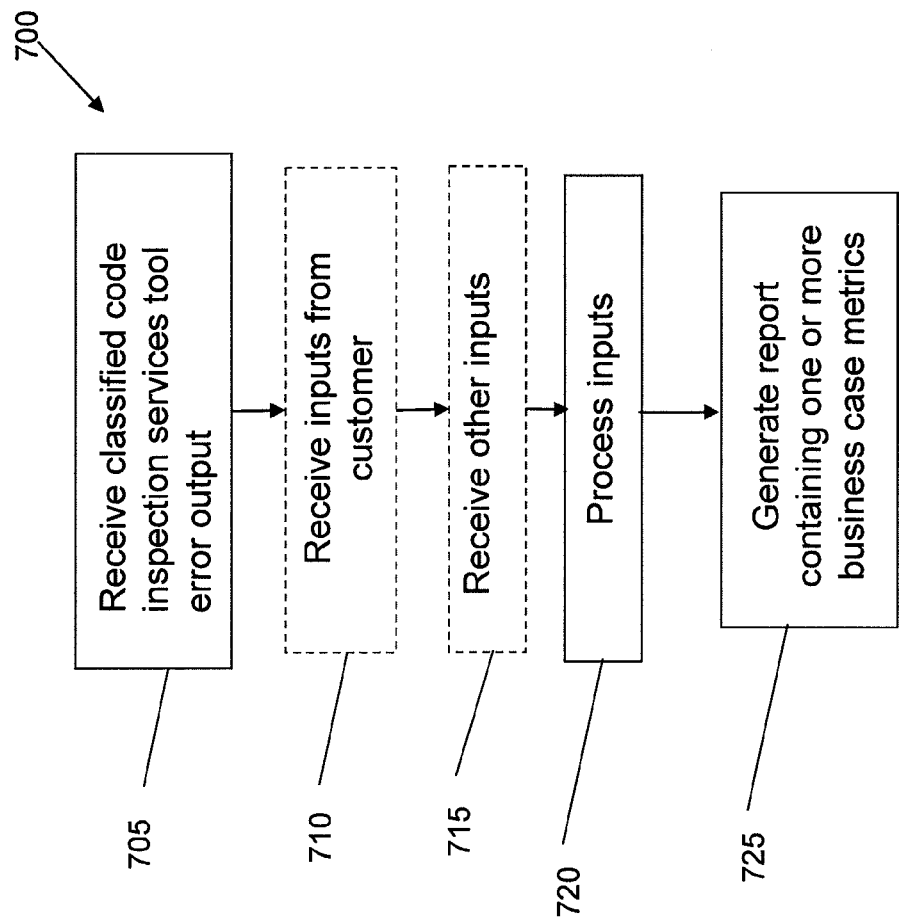
FIGS. 7-12 show exemplary flows for performing aspects of the present invention.

FIG. 7 illustrates a general exemplary flow 700 for practicing aspects of the invention. As shown in FIG. 700, at step 705, a data receiving tool receives the classified code inspection service tool error output. For example, in embodiments, the classified code inspection service tool error output may include defects discovered by each trigger, percentage defects to be reduced after prevention actions taken by each trigger, time spent by the code inspection services, and non-functional requirements/functional requirements (NFR/FR) defect volume escapes to production if code inspection services not used, amongst other inputs. At optional step 710, the data receiving tool receives inputs of data from the customer. For example, in embodiments, the data from a customer may include a test effort, a test efficiency, defect escape probability tables, a current project profile, potential defects and a test process, amongst other data. At optional step 715, the data receiving tool receives other inputs. For example, in embodiments, the other inputs may include average cost to fix defects in different phases of a software development life cycle, daily rate for a human resource, etc. Additionally, in embodiments, the data receiving tool may receive intermediate TPOW data, as explained further below.

At step 720, the data processing tool processes the received data to determine one or more TPOW outputs. Depending on the TPOW output (e.g., a benefit for shifting defect removal earlier, a benefit for preventing the injection of defects, a benefit for reducing cycle time and a benefit for reducing production defects, amongst other outputs), the data processing tool may utilize one or more different inputs derived from the code inspection services, one or more inputs from the customer and one or more other inputs, as explained in more detail below with reference to FIGS. 8-12.

At step 725, the report generation tool generates one or more business case metrics based on the received data, which indicate one or more of a benefit for shifting defect removal earlier, a benefit for preventing the injection of defects, a benefit for reducing cycle time and a benefit for reducing production defects. Examples of business case metrics are explained in more detail below with reference to FIGS. 13-17.

Figure 8:
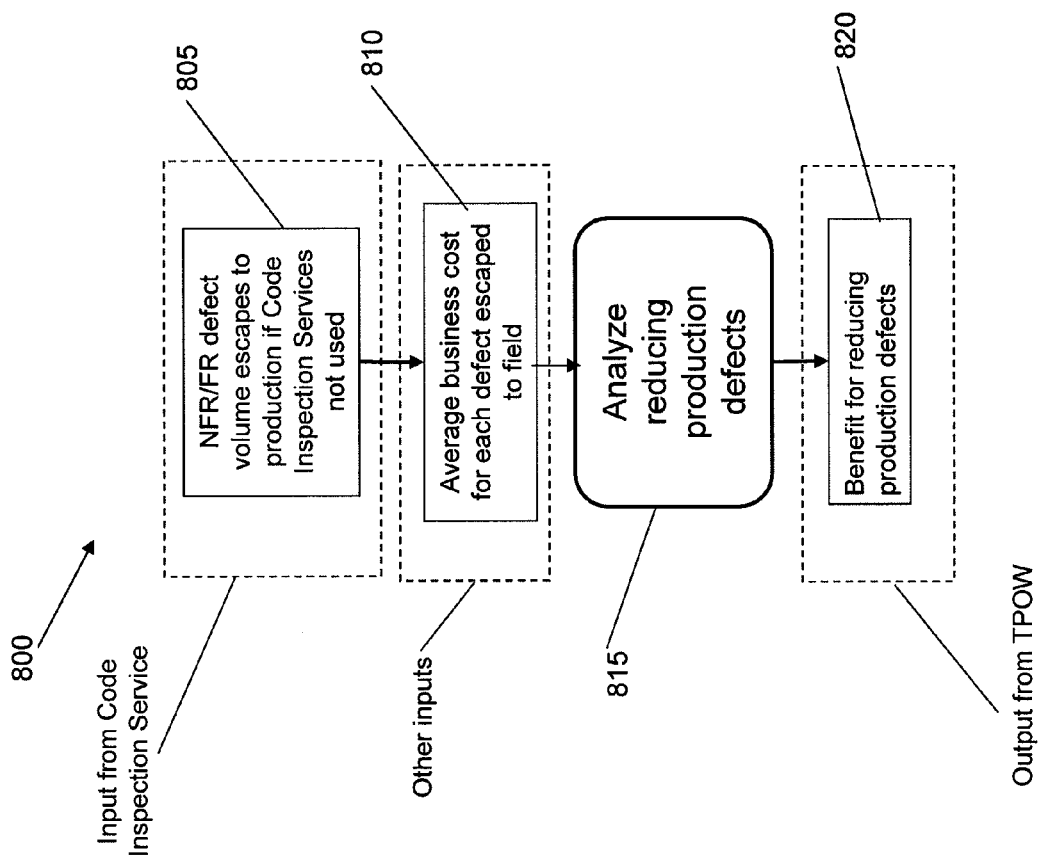

FIG. 8 illustrates an exemplary flow 800 for analyzing the reduction of production phase/activity defects, e.g., defects fixed during the production phase (or activity) of the software development life cycle. As exemplified by cost table 500 discussed above, fixing a defect at the production phase may be exponentially more expensive than fixing that defect at an earlier phase (e.g., at unit test). As such, by reducing the number of defects fixed at the production phase (e.g., by discovering and fixing defects earlier in the software development lifecycle) an organization may realize significant cost savings.

As shown in FIG. 8, to analyze reducing production defects, at step 805, the data receiving tool receives from the code inspection service the NFR/FR defect escapes if code inspection service is not used. That is, the code inspection services will identify a number of defects (e.g., NFR and FR defects). A portion of this identified number of defects represents the number of defect escapes that would occur (e.g., those that would not be found when expected or at a testing phase designed to detect such defects) if the code inspection service not used.

Additionally, at step 810, the data receiving tool receives the average business cost for each defect escape (e.g., as shown in exemplary cost table 600, discussed above). At step 815, the data processing tool analyzes reducing production defects. In embodiments, the data processing tool analyzes reducing production defects by determining the product of the average business cost for each defect and the defect volume of escapes to production if the code inspection services are not used. This resulting product indicates a cost to fix all of the defects (identified by the code inspection services) if these defects are not fixed until the production phase/activity. Conversely, the resulting product also indicates a benefit (e.g., a cost savings) for reducing production defects, for example, by fixing the defects discovered through the code inspection services (e.g., subsequent to utilization of the code inspection services but before the production phase). At step 825, the report generation tool outputs a benefit for reducing production defects (e.g., the cost savings).

Figure 9:
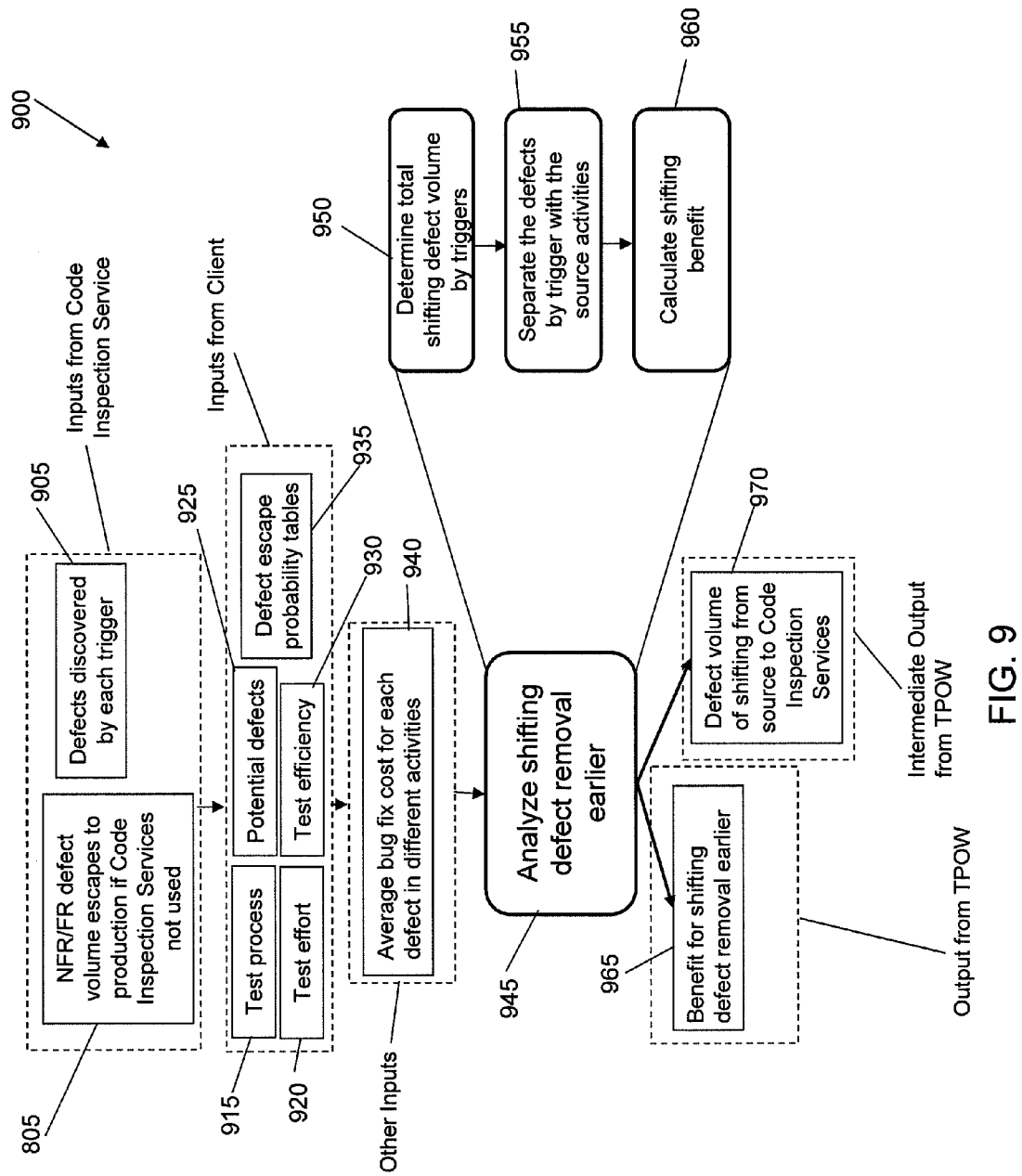

FIG. 9 illustrates an exemplary flow diagram 900 for analyzing the shifting of defect removal earlier in the software development life cycle. As shown in FIG. 9, at steps 905 and 910, the data receiving tool receives data from the code inspection service. More specifically, at step 905, the NFR/FR defect volume escapes to production if code inspection services are not used is received by the data receiving tool. Additionally, at step 910, the defects discovered by each trigger are received by the data receiving tool.

At steps 915-935, the data receiving tool receives data inputs provided by a client. More specifically, at step 915, the data receiving tool receives the test process data. At step 920, the data receiving tool receives the test effort data. At step 925, the data receiving tool receives the potential defects data. At step 930, the data receiving tool receives the test efficiency data. At step 935, the data receiving tool receives the defect escape probability values. At step 940, the data receiving tool receives an average bug fix cost for each defect in different activities, which is one of the "other" inputs.

At step 945, the data processing tool analyzes the shifting of defect removal earlier. As explained above, earlier (in the software development life cycle) defect removal can achieve significant cost savings. As can be observed, the step 945 of analyzing the shifting of defect removal earlier comprises sub-steps 950-960. At step 950, the data processing tool determines a total shifting defect volume by triggers. In embodiments, the data processing tool may determine a total shifting defect volume by triggers by calculating the difference between those defects discovered by code inspection services and those defects escaped to production without code inspection services. For example, if there is a same trigger in a subsequent phase as an earlier phase, that defect can be directly shifted to the earlier phase. Otherwise, the defect may be shifted with defect escape probability tables, e.g., as received from the client.

At step 960, the data processing tool determines a shifting benefit. For example, the data processing tool calculates the defect fix cost difference between discovering defects at the code inspection services, and discovering the defects at subsequent activities (or phases). The costs may be determined using average business costs for each defect by phase (or activity), for example, as shown in FIG. 6.

At step 965, the report generation tool produces one or more business case metrics indicating the benefit for shifting the defect removal. At step 970, the data processing tool determines a defect volume of shifting from source to code inspection services. As shown in FIG. 9, the determination of a defect volume of shifting from source to code inspection services is an intermediate output of the TPOW. That is, this intermediate output may be used as an "other" input, as discussed further below.

Figure 10:
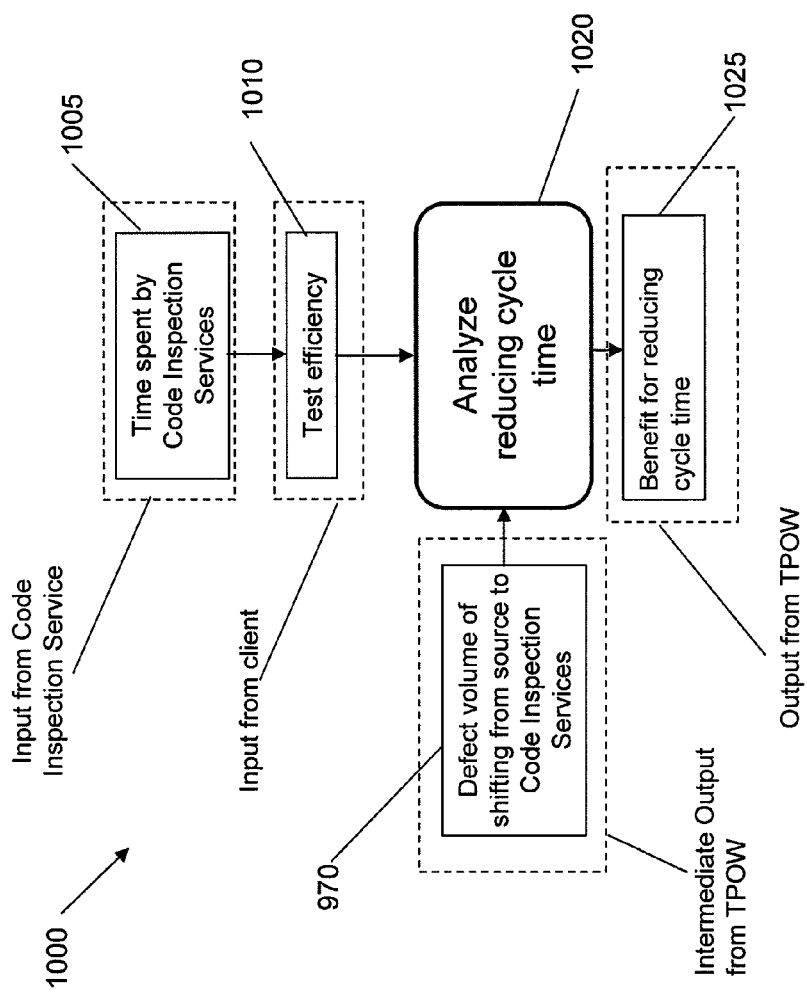

FIG. 10 illustrates an exemplary flow diagram 1000 for analyzing the reduction of cycle time. At step 1005, the data receiving tool receives from the code inspection service the time spent by code inspection service in testing a client's (e.g., an organization's) software code. At step 1010, the data receiving tool receives a test efficiency, which may be provided by the client. At step 1015, the data receiving tool receives the defect volume of shifting from source to code inspection services (which is discussed above with regard to FIG. 9).

At step 1020, the data processing tool analyzes reducing cycle time. In embodiments, the data processing tool analyzes reducing cycle time by dividing the shifting defect volume by the testing efficiency and subtracting the time spent by the code inspection services. For example, if the shifting defect volume is one hundred defects (e.g., that one hundred defects could be removed earlier in the life cycle), a client has a testing efficiency of 10 defects per person-day, and 3 person-days were spent by the code inspection services, then (100 defects/10 defects per person-day) or 10 person-days−3 person-days=7 person-days of benefit for reducing cycle would result. In other words, with the above example, by expending three person-days with the code inspection services, an organization can realize ten person-days of reduced cycle time, or net seven person-days of reduced cycle time. At step 1025, the report generation tool outputs a benefit for reducing cycle time (e.g., a person-day savings).

Figure 11:
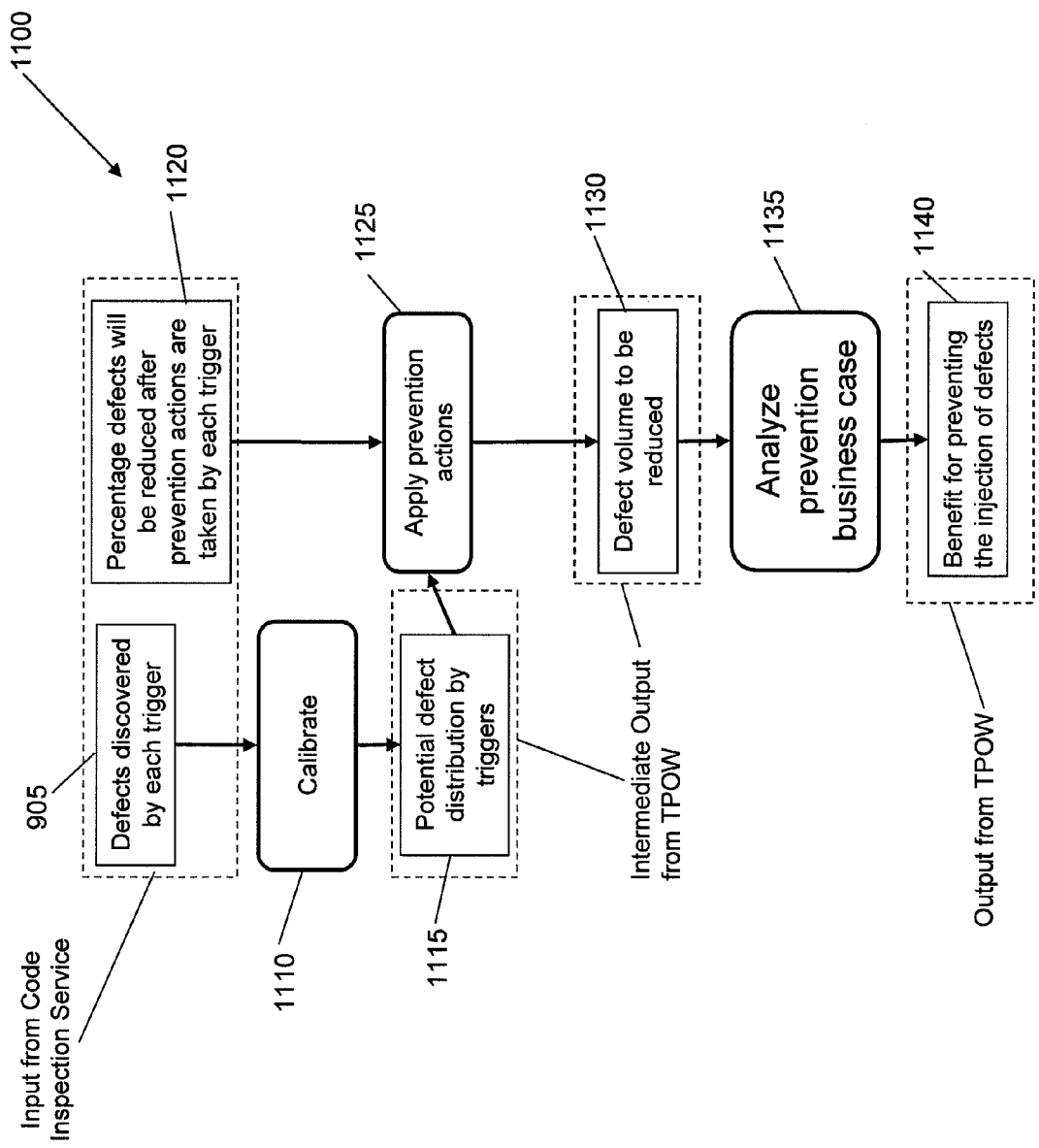

FIG. 11 illustrates an exemplary flow diagram 1100 for analyzing the prevention of defect injection. At step 1105, the data receiving tool receives the defects discovered by each trigger, as determined by the code inspection service. At step 1110, the data processing tool performs a calibration, wherein the potential defect volume and distribution by triggers is adjusted (e.g., updated) in accordance with the discovered defects by each trigger (received from the code inspection services, for example as described in related U.S. application Ser. No. 12/558,274, filed on Sep. 11, 2009). That is, upon removing the identified defects, potential defect volume and distribution by triggers may be affected. Thus, the data processing tool performs the calibration to adjust (e.g., update) the potential defect volume and distribution by triggers based upon the discovered defects.

At step 1115, the data processing tool determines a potential defect distribution by triggers based on the calibration and the data receiving tool receives the potential defect distribution by triggers. At step 1120, the data receiving tool receives the percentage defects will be reduced after prevention actions are taken by each trigger as determined from the code inspection services.

At step 1125, the data processing tool applies prevention actions to determine a defect volume to be reduced. In embodiments, the data processing tool determines a defect volume to be reduced by determining the product of percentage defects will be reduced by each trigger and the total defect volume. At step 1135, the data processing tool analyzes the prevention business case. In embodiments, this analysis can be performed by calculating the costs of the to be discovered defects and costs of the to be escaped defects according to the discovery rate for the total prevention of defects. For example, for discovered defects, a cost is the testing cost plus the fixing cost, and for escaped defects, the cost is the business cost (e.g., the cost of fixing the defect at a later phase in the software development life cycle). At step 1140, the report generation tool outputs a benefit for reducing cycle time (e.g., the cost savings).

Figure 12:
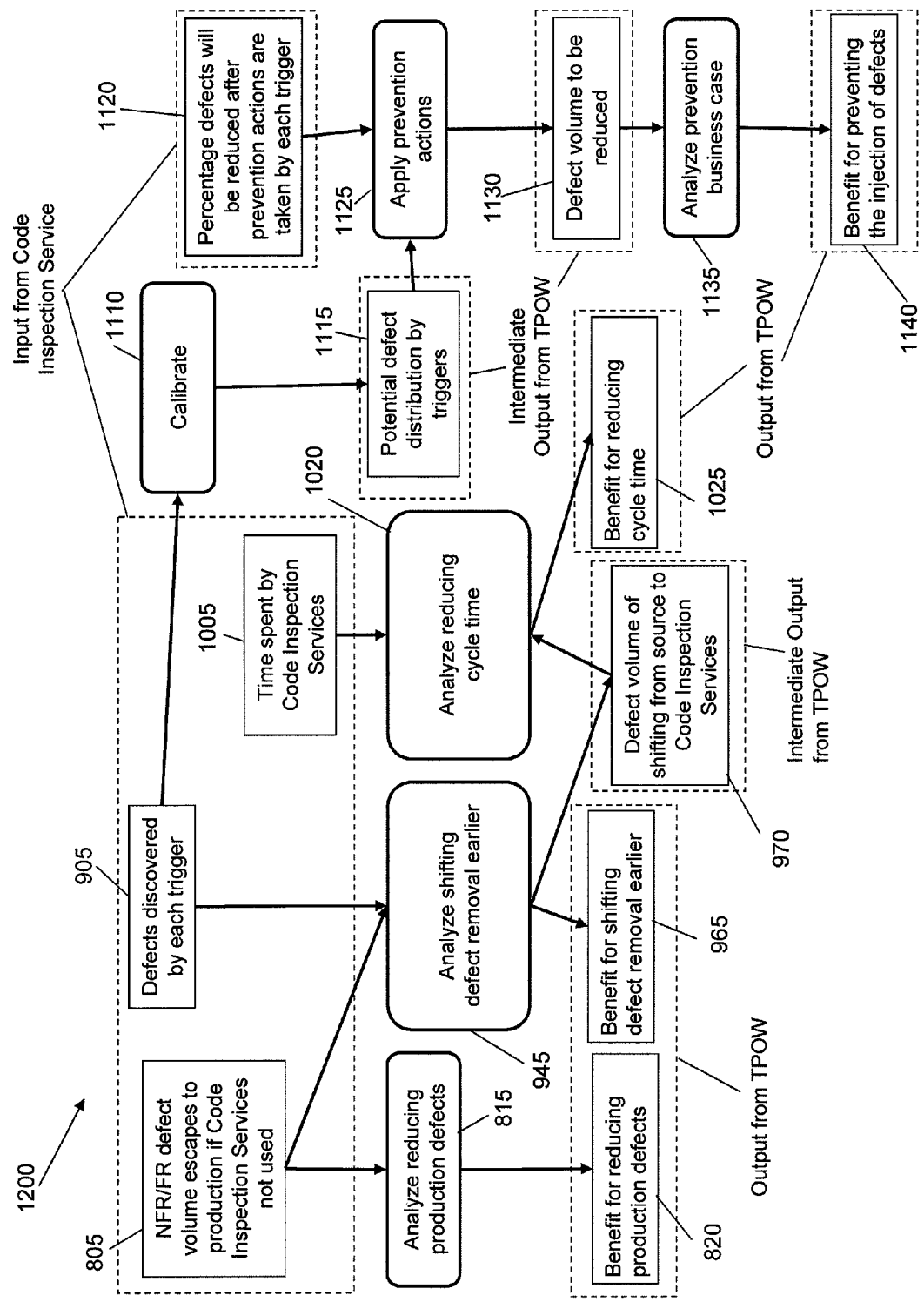

FIG. 12 illustrates an exemplary flow diagram 1200, which is a combined flow of each of FIGS. 7-11. However, as can be observed, the inputs from a client and other inputs are not shown in FIG. 12. More specifically, FIG. 12 illustrates an example of how the different flows may be integrated. For example, FIG. 12 illustrates the intermediate outputs (e.g., defect volume of shifting from source to code inspection services) from TPOW, and how those intermediate outputs may be used as inputs to the TPOW for other benefit determinations (e.g., benefit for reducing cycle time). Additionally, FIG. 12 illustrates that some inputs, for example, inputs from the code inspection services (e.g., defects discovered by each trigger), may be used to determine plural benefits (e.g., a benefit of shifting defect removal earlier and a benefit for preventing the injection of defects). That is, as shown in FIG. 12, the defects discovered by each trigger 905 may be utilized to determine both a benefit of shifting defect removal earlier 965 and a benefit for preventing the injection of defects 1140.

Exemplary Business Case Metrics

FIGS. 13-17 illustrate examples of business case metrics in accordance with aspects of the invention. The report generation tool 40 may generate such business case metrics using the TPOW outputs, as determined by the data processing tool 30, described in the flow diagrams above. The exemplary business case metrics shown in FIGS. 13-17 indicate one or more of a benefit for shifting defect removal earlier, a benefit for preventing the injection of defects, a benefit for reducing cycle time and a benefit for reducing production defects. As should be understood, the business case metrics are exemplary, and thus, should not be construed as limiting the present invention.

Figure 13:
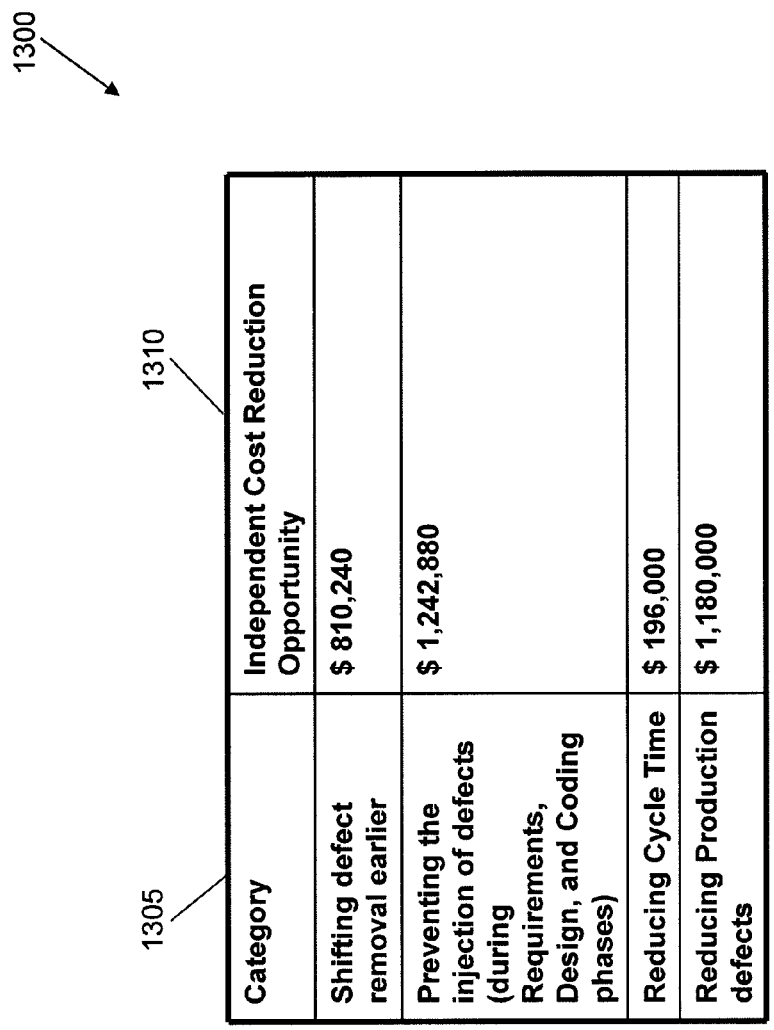

FIG. 13 illustrates an exemplary cost reduction opportunity table 1300. As shown in FIG. 13, the cost reduction opportunity table 1300 includes a category column 1305 listing categories for reducing defects costs (e.g., shifting defect earlier, preventing injection of defects, reducing cycle time and reducing production defects). Additionally, the cost reduction opportunity table 1300 includes an independent cost reduction opportunity column 1310, which indicates the independent cost reduction opportunity for each of the listed categories. The values in the independent cost reduction opportunity column 1310 are determined by the data processing tool 30, for example, as described in the flow diagrams above.

The preventing the injection of defects is typically controllable during the requirements, design and coding phases/activities. That is, injection of defects does not typically occur during the testing phases. The shifting the defect removal earlier represents an opportunity that can be addressed to a significant extent within late test phases of a current project. However, each category represents opportunities that can be addressed with a new release (e.g., a subsequent project). Cycle time reduction may be influenced by many factors; however the cost reduction opportunity (due to the cycle time reduction) determined by the data processing tool reflects the contribution to the cost reduction opportunity due to the code inspection services. Additionally, the reducing production defects cost opportunity may only reflect specific categories of defects that are less likely to be found through standard test practices (e.g., standard system testing, system integration testing, and/or user acceptance testing).

FIG. 14 illustrates an exemplary code inspection services impact on defect discovery table 1400 in accordance with aspects of the invention. As shown in FIG. 14, the code inspection services impact on defect discovery table 1400 includes a phase/activity column 1405 listing the phases 1430 of software development life cycle (e.g., requirements review, unit test, system test, etc.). Additionally, table 1400 includes a benchmark column 1405, which indicates what an ideal percentage of defects that can be removed at each of the phases 1430. In other words, the values of the benchmark column 1410 may indicate an ideal defect removal profile for the organization. The benchmark percentages of defect removals for each of the phases (i.e., the values of the benchmark column 1410) may be determined based on an organization's maturity profile (as discussed in related U.S. application Ser. No. 12/558,327, filed on Sep. 11, 2009) and/or historical data, e.g., of the organization.

Table 1400 also includes a pre-code inspection services column 1415, which indicates a project's defect removal profile before code inspection services. In embodiments, the values for the pre-code inspection services column 1415 may be determined, for example, based on a prior release of the organization and/or a historical distribution for the organization. A post-code inspection services column 1420 indicates a project's defect removal profile after the code inspection services.

As can be observed in comparing columns 1415 and 1420, the defect removal percentages for the phases prior to unit test (e.g., requirements review, high level design review, detailed requirements review and detailed design review) are not affected. That is, code inspection services are used to discover code defects. However, until a project is at the unit test phase, there is no code yet written, and thus no code defects. As such, code inspection services would not find any code defects for these phases (i.e., prior to unit test) of the life cycle, and thus no change in the defect removal activity values for these phases would occur.

In contrast, as can be observed in FIG. 14, the defect removal value for unit test post-code inspection services has increased as compared to the corresponding pre-code inspection services value. This increased value is indicative of the defects that the code inspection services have found that otherwise would not have been found at the unit test phase. That is, without the code inspection services, those defects that would have been discovered by the code inspection services at unit test may still be discovered (e.g., through subsequent testing), but only at a later (and more expensive) phase in the life cycle. As additionally shown in FIG. 14, subsequent to the unit test for the post-code inspection services, the defect removal percentages decrease. That is, because a greater number of the defects were removed earlier (e.g., at unit test) these defects are no longer present during those phases subsequent to unit test. As such, the defect removal profiles in the post-code inspection services column 1420 after unit test may be lower, as compared to the defect removal profiles in the corresponding pre-code inspection services column 1415.

Table 1400 also includes a defect count and cost savings column 1425. As shown in FIG. 14, the defect count and cost savings column 1425 indicates a defect count (as determined by the code inspection services) and a cost savings. The cost savings of performing the code inspection services for each of the phases may be determined by the data processing tool 30, as discussed above with regard to the flow diagrams. For example, the cost per defect removal at a particular phase may be determined using the exemplary cost table 600 (as shown in FIG. 6). As such, code inspection services would not find any code defects for these phases (i.e., prior to unit test) of the life cycle, and thus no change in the defect removal activity values for these phases would occur, column 1425 indicates "n/a" for these phases.

By providing a client with this information, the client will have a clear understanding of the benefits that should result from taken such actions. Having a clear understanding of the benefits of such actions, enables the client to make better planning and development decisions, such as, implementing such actions, which results in significant cost savings. A comparison of the defect analysis of pre- and post-defect discovery enables not only an accurate and detailed measurement of effectiveness, but also identifies specific targets and enables identification of remedial actions.

FIG. 15 illustrates business case metrics which enable the prevention of defect injection in early phases of the software development life cycle. More specifically, FIG. 15 illustrates exemplary pre- and post-code inspection services defect discoveries by phase comparison tables 1500 in accordance with aspects of the invention. As shown in FIG. 15, the pre-code inspection services defect discoveries by phase table 1505 indicates defect discoveries at phases 1515 in the software development life cycle (e.g., reviews, unit test (UT), system test (ST), etc.), for example, as a percentage 1520 of total defects. Additionally, the pre-code inspection services defect discoveries by phase table 1505 indicates a cost 1525 for discovering defects at each phase 1515. In embodiments, the percentages 1520 for the pre-code inspection services defect discoveries by phase table 1505 may be determined, for example, based on an organization's maturity profile and/or an organization's historical data. Additionally, the data processing tool 30 (shown in FIG. 1) may determine the costs 1525 utilizing, for example, the percentages 1520, a KLOC value (which indicates a number of expected defects based upon the total number of lines of code) and the industry costs per defect at phases (e.g., as shown in FIG. 6).

Post-code inspection services defect discoveries by phase table 1510 indicates actual or projected defect discoveries by phase subsequent to utilization of code inspection services. That is, post-code inspection services defect discoveries by phase table 1510 illustrates an impact of performing the code inspection services on preventing defect injection in early phases of the software development life cycle. The post-code inspection services defect discoveries by phase table 1510 also indicates a cost 1525 for discovering defects at each phase 1515. In embodiments, the data processing tool 30 may determine the percentages 1520 for the post-code inspection services defect discoveries by phase table 1510, for example, as described in the flow diagrams above (e.g., FIG. 11). Additionally, the data processing tool 30 (shown in FIG. 1) may determine the costs 1525 utilizing, for example, the percentages 1520, a KLOC value (which indicates a number of expected defects based upon the total number of lines of code) and the industry costs per defect at phases (e.g., as shown in FIG. 6).

In embodiments, the exemplary pre- and post-code inspection services defect discoveries by phase comparison tables 1500 may be used to illustrate (e.g., to a client) top recommended preventative actions (e.g., a shifting of greater resources to earlier testing), that have been taken (or can be taken) to prevent the injection of defects. By providing a client with this information, the client will have a clear understanding of the benefits that should result from taken such actions. Having a clear understanding of the benefits of such actions, enables the client to make better planning and development decisions, such as, implementing such actions, which results in significant cost savings. A comparison of the defect analysis of pre- and post-defect discovery enables not only an accurate and detailed measurement of effectiveness, but also identifies specific targets and enables identification of remedial actions.

FIG. 16 illustrates business case metrics which enable the reduction of cycle time. More specifically, FIG. 16 illustrates exemplary pre- and post-code inspection services person-days by phase comparison tables 1600 in accordance with aspects of the invention. As shown in FIG. 16, the pre-code inspection services person-days by phase table 1605 indicates person-days 1620 at phases 1615 in the software development life cycle (e.g., reviews, unit test (UT), system test (ST), etc.). Additionally, the pre-code inspection services person-days by phase table 1605 indicates a cost 1625 at each phase 1615. In embodiments, the person-days 1520 for the pre-code inspection services person-days by phase table 1605 may be determined, for example, based on an organization's historical data. Additionally, the data processing tool 30 (shown in FIG. 1) may determine the costs 1525 utilizing, for example, the person-days 1620 and a daily rate for human resources (e.g., an "other" input, described above), which, in embodiments, may be an industry determined rate.

Post-code inspection services person-days by phase table 1610 indicates actual or projected person-days by phase subsequent to utilization of code inspection services. That is, post-code inspection services person-days by phase table 1610 illustrates an impact of performing the code inspection services on reducing cycle time. The post-code inspection services defect discoveries by phase table 1610 also indicates a cost 1625 for person-days at each phase 1615. In embodiments, the data processing tool 30 may determine the person-days 1620 for the post-code inspection services defect discoveries by phase table 1610, for example, as described in the flow diagrams above (e.g., FIG. 10). Additionally, the data processing tool 30 (shown in FIG. 1) may determine the costs 1525 utilizing, for example, the person-days 1620 and a daily rate for human resources (e.g., an "other" input, described above), which, in embodiments, may be an industry determined rate.

In embodiments, the exemplary pre- and post-code inspection services person-days by phase comparison tables 1600 may be used to illustrate (e.g., to a client) top recommended preventative actions (e.g., a performing code inspection services), that have been taken (or can be taken) to reduce cycle time. By providing a client with this information, the client will have a clear understanding of the benefits that should result from taken such actions. Having a clear understanding of the benefits of such actions, enables the client to make better planning and development decisions, such as implementing such actions, which results in significant cost savings.

Figure 17:
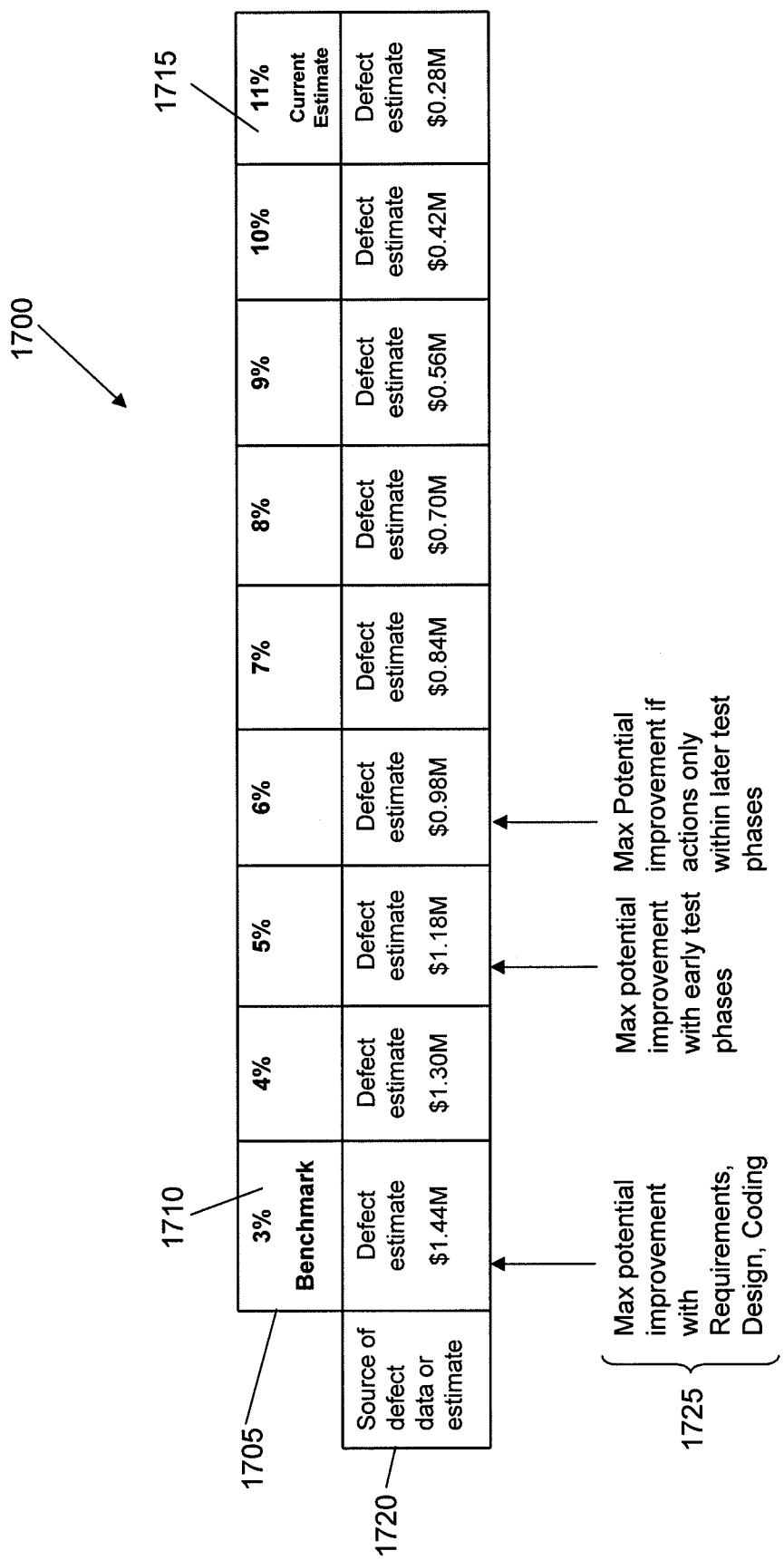

FIG. 17 illustrates an exemplary business case metric table 1700, which indicates the cost reduction opportunity associated with a reduction of production defects. As noted above, production defects (as they arise late in the software development life cycle) are very expensive to remove, as compared to removal earlier in the life cycle. As shown in FIG. 17, exemplary table 1700 includes a percentage of production defects row 1705, which, in embodiments, may range from a benchmark 1710 (of production defects), e.g., three percent, to a current estimate 1715 of production defects (e.g., eleven percent). It should be understood that the percentages in FIG. 17 are exemplary, and that the invention contemplates other percentages. The benchmark 1710 and the current estimate 1715 of production defects may be determined, as discussed above with reference to FIG. 14.

Additionally, table 1700 includes a defect estimate row 1720, which indicates a defect estimate corresponding to each percentage of production defects. The defect estimates in the defect estimate row 1720 may be determined using the flows described above (e.g., as shown in FIG. 8). Table 1700 also includes a maximum potential improvement row 1725, which indicates what actions would be necessary to achieve the corresponding percentage of production defects.

For example, with the example shown in FIG. 17, a project has a current estimate 1715 of production defects of eleven percent, indicating that eleven percent of the projects total defects will be fixed at the production phase of the life cycle. As indicated in FIG. 17, the maximum potential improvement for the project if actions are taken only within later test phases (e.g., system test (ST), system integration test (SIT), performance test, and/or user acceptance test (UAT)) as a five percent reduction in production defects (as compared to the current estimate). That is, with the example of FIG. 17, actions taken only within later test phase will reduce the production defects from the current estimate of eleven percent down to six percent. In other words, FIG. 17 illustrates (e.g., to a client) that by implementing actions only within later test phases, the number of defects discovered at production will be reduced (e.g., the defects are discovered earlier in the software development life cycle). Furthermore, as indicated by exemplary table 1700, if the organization implements actions within the early test phases (e.g., unit test) in addition to the actions taken in later test phases, the production defect percentage may be reduced to five percent of the total defects. FIG. 17 also illustrates the benchmark 1710 of production defects (e.g., three percent) may be attained with improvements made during the earliest phases of the life cycle (e.g., requirements, design and coding) in addition to the early and later test phase improvements.

Thus, exemplary business case metric table 1700, which quantifies the cost reduction opportunity associated with a reduction of production defects, enables an organization to understand the benefits (actual and/or expected) of improvements (e.g., earlier testing, increased resource investment, etc.) made during the different stages of the software development life cycle. By providing a client with this information, the client will have a clear understanding of the benefits that should result from taken such actions. Having a clear understanding of the benefits of such actions, enables the client to make better planning and development decisions, such as implementing such actions, which results in significant cost savings.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable storage medium having programming instructions operable to:
    receive data including code inspection services defect analysis data of a software development project;
    process the data;
    determine one or more business metrics based on the data; and
    generate at least one report based on the one or more business metrics comprising at least one of a benefit for shifting defect removal earlier, a benefit for preventing an injection of defects, a benefit for reducing a cycle time and a benefit for reducing production defects,
    wherein for determining the benefit for shifting the defect removal earlier:
        the receiving the data comprises:
            receiving non-functional requirement (NFR) and functional requirement (FR) defect volume escapes that are expected if code inspection services are not used and defects discovered by each trigger from the code inspection services;
            receiving at least one of a test process, a test effort, potential defects, test efficiency and defect escape probability tables; and
            receiving an average cost for each defect in different activities; and
        the processing the data comprises:
            determining a total shifting defect volume by triggers;
            shifting defects by type from a source activity to an activity when the code inspection services are performed, wherein a defect is one of directly shifted and shifted with a defect probability table; and
            calculating a shifting benefit as a defect fix cost difference between discovering one or more defects at the source activity and discovering the one or more defects using the code inspection services.

2. The method of claim 1, wherein the code inspection services defect analysis data comprises at least one of a quantity of defects discovered by each trigger, a percentage of defects which will be reduced by each trigger after prevention actions are taken, a time spent by the code inspection services and the NFR and the FR defect volume escapes if the code inspection services are not used.

3. The method of claim 1, wherein the receiving the data further comprises receiving one or more organization inputs, wherein the determining the one or more business metrics is additionally based on the one or more organization inputs.

4. The method of claim 3, wherein the one or more organization inputs comprises at least one of a test effort, the test efficiency, the defect escape probability tables, a current project profile, the potential defects and the test process.

5. The method of claim 1, wherein the receiving the data further comprises receiving one or more other inputs, wherein the determining the one or more business metrics is additionally based on the one or more other inputs.

6. The method of claim 5, wherein the one or more other inputs comprises at least one of an average cost to fix defect in different phases of a software development life cycle and a daily rate for a human resource.

7. The method of claim 1, wherein for determining the benefit for preventing the injection of defects:
the receiving the data comprises receiving from the code inspection services defects discovered by each trigger and a percentage of defects reduction by each trigger resulting from preventative actions being taken; and
the processing the data comprises:
determining a defect volume to be reduced by calculating a product of the percentage of defects reduction and a total defect volume of the software development project; and
calculating the benefit for preventing the injection of defects.

8. The method of claim 7, wherein:
for discovered defects, the benefit for preventing the injection of defects is the sum of a testing cost and a fix cost; and
for escaped defects, the benefit for preventing the injection of defects is determined based on a business case.

9. The method of claim 1, wherein for determining the benefit for reducing the cycle time:
the receiving the data comprises:
receiving a time spent by the code inspection services; and
receiving the test efficiency; and
the processing the data comprises:
determining a defect volume shifting from the source activity to the activity when the code inspection services are performed; and
calculating the benefit for reducing the cycle time as the defect volume shifting from the source activity to the optimally-timed discovery divided by the test efficiency minus the time spent by the code inspection services.

10. The method of claim 1, wherein for determining the benefit for reducing production defects:
the receiving the data comprises:
receiving the NFR and the FR defect volume escapes that are expected if the code inspection services are not used and the defects discovered by each trigger from the code inspection services; and
receiving an average fix cost for defects escaped to production; and
the processing the data comprises:
determining a reduced production defect volume as a difference between potential production defects and the production defect rate after DAS actions; and
calculating the benefit for reducing production defects as a product of the average fix cost for defects escaped to production and each of the NFR and FR defect volume escapes.

11. The method of claim 1, wherein a service provider at least one of creates, maintains, deploys and supports the computer infrastructure.

12. The method of claim 1, wherein steps are provided by a service provider on a subscription, advertising, and/or fee basis.

13. A system implemented in hardware, comprising:
a data receiving tool operable to receive data including at least one of code inspection services analysis data, organization data and other data;
a data processing tool operable to process the data and determine one or more business metrics based on the data, wherein the one or more business metrics comprises at least one of:
a benefit for shifting defect removal earlier;
a benefit for preventing an injection of defects;
a benefit for reducing a cycle time;
a benefit of reducing invalid defects; and
a benefit for reducing production defects; and
a report generation tool operable to generate at least one report based on the one or more business metrics,
wherein for determining the benefit for shifting the defect removal earlier:
the data receiving tool is operable to:
receive non-functional requirement (NFR) and functional requirement (FR) defect volume escapes that are expected if code inspection services are not used and defects discovered by each trigger from the code inspection services;
receive at least one of a test process, a test effort, potential defects, test efficiency and defect escape probability tables; and
receive an average cost for each defect in different activities; and
the data processing tool is operable to:
determine a total shifting defect volume by triggers;
shift defects by type from a source activity to an activity when the code inspection services are performed, wherein a defect is one of directly shifted and shifted with a defect probability table; and
calculate a shifting benefit as a defect fix cost difference between discovering one or more defects at the source activity and discovering the one or more defects using the code inspection services.

14. The system of claim 13, wherein:
the code inspection services defect analysis data comprises at least one of a quantity of defects discovered by each trigger, a percentage defects will be reduced by each trigger after prevention actions are taken, a time spent by the code inspection services and the NFR and the FR defect volume escapes if the code inspection services not used;
the organization data comprises at least one of the test effort, the test efficiency, the defect escape probability tables, a current project profile, the potential defects and the test process; and
the one or more other inputs comprises at least one of an average cost to fix defect in different phases of a software development life cycle and a daily rate for a human resource.

15. The system of claim 13, wherein for determining the benefit for preventing the injection of defects, the data processing tool is operable to determine a defect volume to be reduced by:
- calculating a product of a percentage of defects reduction and a total defect volume of a software development project; and
- calculating the benefit for preventing the injection of defects, wherein:
  - for discovered defects, the benefit for preventing the injection of defects is the sum of a testing cost and a fix cost; and
  - for escaped defects, the benefit for preventing the injection of defects is determined based on a business case.

16. The system of claim 13, wherein for determining the benefit for reducing the cycle time:
- the data receiving tool is operable to:
  - receive a time spent by the code inspection services; and
  - receive the test efficiency;
- the data processing tool is operable to:
  - determine a defect volume shifting from the source activity to the activity when the code inspection services are performed; and
  - calculate the benefit for reducing the cycle time as the defect volume shifting from the source activity to the optimally-timed discovery divided by the test efficiency minus the time spent by the code inspection services.

17. The system of claim 13, wherein for determining the benefit for reducing the production defects:
- the data receiving tool is operable to:
  - receive the NFR and FR defect volume escapes that are expected if the code inspection services are not used and defects discovered by each trigger from the code inspection services; and
  - receive an average fix cost for defects escaped to production; and
- the data processing tool is operable to:
  - determine a reduced the production defect volume as a difference between potential production defects and the production defect rate after DAS actions; and
  - calculate the benefit for reducing production defects as a product of the average fix cost for defects escaped to production and each of the NFR and FR defect volume escapes.

18. A computer program product comprising a computer usable storage medium having readable program code embodied in the storage medium, the computer program product includes at least one component operable to:
- receive data including code inspection services defect analysis data of a software development project from a code inspection tool utilized by a service provider on an as-needed basis;
- process the data;
- determine one or more business metrics based on the data including at least one of a benefit for shifting defect removal earlier, a benefit for preventing an injection of defects, a benefit for reducing a cycle time and a benefit for reducing production defects; and
- generate at least one report based on the one or more business metrics,
wherein the one or more business metrics are determined based on the code inspection services defect analysis data received from the service provider.

19. The computer program product of claim 18, wherein the code inspection services defect analysis data comprises at least one of a quantity of defects discovered by each trigger, a percentage defects will be reduced by each trigger after prevention actions are taken, a time spent by the code inspection services and non-functional requirement (NFR) and functional requirement (FR) defect volume escapes if the code inspection services not used.

20. The computer program product of claim 18, wherein:
- the one or more organization inputs comprises at least one of a test effort, a test efficiency, defect escape probability tables, a current project profile, potential defects and a test process; and
- the one or more other inputs comprises at least one of an average cost to fix defect in different phases of a software development life cycle and a daily rate for a human resource.

21. The computer program product of claim 18, wherein:
for determining the benefit for shifting the defect removal earlier:
- the receiving the data comprises:
  - receiving non-functional requirement (NFR) and functional requirement (FR) defect volume escapes that are expected if the code inspection services are not used and defects discovered by each trigger from the code inspection services;
  - receiving at least one of a test process, a test effort, potential defects, test efficiency and defect escape probability tables; and
  - receiving an average cost for each defect in different activities; and
- the processing the data comprises:
  - determining a total shifting defect volume by triggers;
  - shifting defects by type from a source activity to an activity when the code inspection services are performed, wherein the defect is one of directly shifted and shifted with a defect probability table; and
  - calculating a shifting benefit as a defect fix cost difference between discovering one or more defects at the source activity and discovering the one or more defects using the code inspection services;

for determining the benefit for preventing the injection of the defects:
- the receiving the data comprises receiving from the code inspection services defects discovered by each trigger and a percentage of defects reduction by each trigger resulting from preventative actions being taken; and
- the processing the data comprises:
  - determining a defect volume to be reduced by calculating a product of the percentage of defects reduction and a total defect volume of the software development project; and
  - calculating the benefit for preventing the injection of defects, wherein:
    - for discovered defects, the benefit for preventing the injection of defects is the sum of a testing cost and a fix cost; and
    - for escaped defects, the benefit for preventing the injection of defects is determined based on a business case;

for determining the benefit for reducing the cycle time:
- the receiving the data comprises:
  - receiving a time spent by the code inspection services; and
  - receiving a test efficiency; and
- the processing the data comprises:
  - determining a defect volume shifting from a source activity to an activity when the code inspection services are performed; and calculating the benefit for reducing the cycle time as the defect volume shifting from the source activity to the optimally-timed discovery divided by the test efficiency minus the time spent by the code inspection services; and for determining the benefit for reducing the production defects:

the receiving the data comprises:

receiving non-functional requirement (NFR) and functional requirement (FR) defect volume escapes that are expected if the code inspection services are not used and defects discovered by each trigger from the code inspection services; and receiving an average fix cost for defects escaped to production; and the processing the data comprises:

determining a reduced production defect volume as a difference between potential production defects and the production defect rate after DAS actions; and calculating the benefit for reducing production defects as a product of the average fix cost for defects escaped to production and each of the NFR and FR defect volume escapes.

22. A computer system for classifying automated code inspection services defect output for defect analysis, the system comprising:

a CPU, a computer readable memory and a computer readable storage media;

first program instructions to receive data including code inspection services defect analysis data of a software development project;

second program instructions to process the data to determine one or more business metrics based on the data including at least one of a benefit for shifting defect removal earlier, a benefit for preventing an injection of defects, a benefit for reducing a cycle time and a benefit for reducing production defects; and third program instructions to generate at least one report based on the one or more business metrics, wherein:

determining for the benefit for preventing the injection of the defects:

the receiving the data comprises receiving from the code inspection services defect analysis data discovered by each trigger and a percentage of defects reduction by each trigger resulting from preventative actions being taken; and the processing the data comprises:

determining a defect volume to be reduced by calculating a product of the percentage of defects reduction and a total defect volume of the software development project; and calculating the benefit for preventing the injection of defects; and the first, second and third program instructions are stored on the computer readable storage media for execution by the CPU via the computer readable memory.

* * * * *